(12) United States Patent
Sieczkowski et al.

(10) Patent No.: US 7,959,806 B2
(45) Date of Patent: Jun. 14, 2011

(54) MINE INFLUENCED WATER REMEDIATION USING BIOREMEDIATION SUBSTRATE

(75) Inventors: Michael R. Sieczkowski, Lenexa, KS (US); Donovan N. Smith, Parkville, MO (US); Wayne H. Wilke, Leawood, KS (US); Rachel Brennan, Port Matilda, PA (US)

(73) Assignees: JRW Bioremediation, LLC, Lenexa, KS (US); The Penn State Research Foundation, University Park, PA (US)

( * ) Notice: Subject to any disclaimer, the term of this patent is extended or adjusted under 35 U.S.C. 154(b) by 344 days.

(21) Appl. No.: 12/111,099

(22) Filed: Apr. 28, 2008

(65) Prior Publication Data

US 2008/0264857 A1    Oct. 30, 2008

Related U.S. Application Data

(63) Continuation-in-part of application No. 12/049,959, filed on Mar. 17, 2008.

(60) Provisional application No. 60/914,524, filed on Apr. 27, 2007.

(51) Int. Cl.
    *C01F 3/00*    (2006.01)
(52) U.S. Cl. ......... 210/601; 210/631; 210/688; 210/743
(58) Field of Classification Search .................. 210/601, 210/631, 688, 743
    See application file for complete search history.

(56) References Cited

U.S. PATENT DOCUMENTS

| | | | |
|---|---|---|---|
| 4,156,647 A | * | 5/1979 | Nieuwenhuis ................ 210/684 |
| 4,401,569 A | | 8/1983 | Jhaveri et al. |
| 4,585,482 A | | 4/1986 | Tice et al. |
| 5,006,250 A | | 4/1991 | Roberts et al. |
| 5,071,754 A | | 12/1991 | Walkup et al. |
| 5,089,123 A | * | 2/1992 | DeVoe .......................... 210/189 |
| 5,200,343 A | | 4/1993 | Cole et al. |
| 5,264,018 A | | 11/1993 | Koenigsberg et al. |
| 5,277,815 A | | 1/1994 | Beeman |
| 5,342,769 A | | 8/1994 | Hunter et al. |
| 5,395,419 A | | 3/1995 | Farone et al. |
| 5,434,241 A | | 7/1995 | Kim et al. |

(Continued)

FOREIGN PATENT DOCUMENTS

EP    075110981694    12/2007

(Continued)

OTHER PUBLICATIONS

Callaway, E.S. & Martin, S.A.; "Effects of a *Saccharomyces cerevisiae* Culture on Ruminal Bacteria that Utilize Lactate and Digest Cellulose", Nutrition, Feeding, and Calves; J. Dairy Sci 1997; 80; pp. 2035-2044.

(Continued)

*Primary Examiner* — Chester T Barry
(74) *Attorney, Agent, or Firm* — Lathrop & Gage LLP

(57) ABSTRACT

A new and improved method for treating mine influenced water (MIW) or other environmental contamination is disclosed. A number of electron donors are disclosed, including chitin complex-containing materials. The chitin complex-containing materials may modify the pH and reductive-oxidation potential of the contaminated media within the subsurface or within a treatment cell to facilitate metal removal through biological, chemical, and physical means, or a combination thereof. Bioremediation enhancing agents such as yeast products may also be used to facilitate microbial treatment of the contaminated sources. The yeast products may work with microbes to improve the rate of contaminant removal and promote microbial growth.

39 Claims, 7 Drawing Sheets

U.S. PATENT DOCUMENTS

| | | | |
|---|---|---|---|
| 5,464,771 | A | 11/1995 | Bryant et al. |
| 5,516,688 | A | 5/1996 | Rothmel |
| 5,554,290 | A | 9/1996 | Suthersan |
| 5,560,904 | A | 10/1996 | Laugier et al. |
| 5,587,317 | A | 12/1996 | Odom |
| 5,602,296 | A | 2/1997 | Hughes et al. |
| 5,658,795 | A | 8/1997 | Kato et al. |
| 5,753,122 | A | 5/1998 | Taylor et al. |
| 5,766,929 | A | 6/1998 | Orolin et al. |
| 5,833,855 | A | 11/1998 | Saunders |
| 5,840,571 | A | 11/1998 | Beeman et al. |
| 5,910,245 | A | 6/1999 | Bernhardt et al. |
| 5,932,472 | A | 8/1999 | Abdullah |
| 5,993,658 | A | 11/1999 | Kato et al. |
| 6,001,252 | A | 12/1999 | Rice et al. |
| 6,264,841 | B1 * | 7/2001 | Tudor .................. 210/688 |
| 6,265,205 | B1 | 7/2001 | Hitchens et al. |
| 6,420,594 | B1 | 7/2002 | Farone et al. |
| 6,472,198 | B1 | 10/2002 | Semprini et al. |
| 6,562,235 | B1 | 5/2003 | Newell et al. |
| 6,589,776 | B1 | 7/2003 | Harkness |
| 6,783,678 | B2 | 8/2004 | Sorenson et al. |
| 7,045,339 | B2 | 5/2006 | Sorenson et al. |
| 7,138,059 | B2 | 11/2006 | Sorenson et al. |
| 2005/0239189 | A1 | 10/2005 | Schaffner |
| 2006/0000783 | A1 | 1/2006 | Branning et al. |
| 2007/0051676 | A1 | 3/2007 | Chandraghatgi et al. |

FOREIGN PATENT DOCUMENTS

| | | |
|---|---|---|
| WO | WO 99/24367 | 5/1999 |
| WO | WO9966080 | 12/1999 |
| WO | WO0132715 A1 | 5/2001 |

OTHER PUBLICATIONS

T. Miller-Webster, et al.; "Influence of Yeast Culture on Ruminal Microbial Metabolism in Continuous Culture"; J. Dairy Sci 2002; 85; pp. 2009-2014.

Nisbet, D.J. & Martin, S.A.; "Effect of a *Saccharomyces cerevisiae* culture on lactate utilization by the ruminal bacterium *Selenomonas ruminantium*"; J. Anim. Sci. 1991; 69; pp. 4628-4633.

Rockne, K.J. & Reddy, K.R.; "Bioremediation of Contaminated Sites"; Oct. 2003; International e-Conference on Modern Trends in Foundation Engineering: Geotechnical Challenges and Solutions; pp. 1-22.

Williams, P.E. et al; Effects of the inclusion of yeast culture *Saccharomyces cerevisiae* plus growth medium) in the diet of dairy cows on milk yield and forage degradation and fermentation patterns in the rumen of steers; J. Anim. Sci. 1991; 69; pp. 3016-2036.

PCT/US2008/061808 International Search Report and Written Opinion, mailed Aug. 7, 2008; 14 pages.

PCT/US2008/ 057250,Invitation to Pay Additional Fees and Partial International Search Report, mailed Jul. 23, 2008; 4 pages.

Laus, R. et al., Reduction of Acidity and Removal of Metal Ions From Coal Mining Effluents Using Chitosan Microspheres, ScienceDirect, Journal of Hazardous Materials, 2007, pp. 471-474.

Moret, A, Rubio, J., Sulphate and Molybdate Ions Uptake By Chitin-Based Shrimp Shells, ScienceDirect, Minerals Engineering, 2003, pp. 715-722.

Brennan R.A. et al., Biodegradation of Tetrachloroethene by Chitin Fermentation Products in a Continuous Flow Column System Journal Of Environmental Engineering, Jun. 2006, pp. 664-673.

Vera, S.M. et al., Evaluation of Different Polymeric Organic Materials for Creating Conditions That Favor Reductive Processes in Groundwater, (2001) *Bioremediation Journal* 5(3): 169-181.

Passive Remediation of Acid Mine Drainage Using Chitin, Rachel A. Brennan, Mar. 1, 2006, 7 pages.

Daubert, L.N. & Brennan, R.A., A Laboratory Investigation of Passive Acid Mine Drainage Treatment Using Chitin (URE Poster) Apr. 2006, 1 page.

* cited by examiner

MINE INFLUENCED WATER REMEDIATION USING BIOREMEDIATION SUBSTRATE

RELATED APPLICATIONS

This application claims priority of U.S. Provisional Application No. 60/914,524 filed on Apr. 27, 2007 and is a continuation-in-part of U.S. patent application Ser. No. 12/049,959 filed on Mar. 17, 2008. The contents of both prior applications are hereby incorporated into this application by reference.

BACKGROUND

1. Field of the Invention

The present disclosure pertains to the use of biopolymer substrates in the remediation of contaminated materials. More particularly, the disclosure relates to the use of certain bioremediation enhancing agents that facilitate the chemical, physical and biological transformation of certain metals and minerals associated with Mine Influenced Water (MIW). MIW is water that can contain metals or minerals associated with the disturbance of soil and/or rock that has been exposed to air and/or water and includes water commonly referred to as Acid Mine Drainage.

2. Description of Related Art

The use of carbon substrates to promote reducing conditions within a subsurface to remediate contaminants has been a commercial option since the early 1990's and in some cases even before 1990. Bacteria and other microbes metabolize the carbon substrate as an electron donor along with an electron acceptor thereby obtaining energy for growth and reproduction. Under certain pH and reductive-oxidation potentials (a measure of a substance's affinity for electrons and commonly referred to as oxidation/reduction potential, ORP, or reductive-oxidation potential, redox), many dissolved metals and minerals may be used as electron acceptors and can be chemically changed through metabolic and chemical processes.

Typical MIW exhibits low pH due to high levels of sulfate either chemically or biologically leached from exposed minerals such as pyrite. Other types of MIW exhibit high pH and high levels of dissolved metals. Lower pH water further promotes the dissolution of metals associated with the parent material. The use of carbon substrates to promote biological treatment of MIW is limited by an inefficiency of microbial populations to precipitate a large amount of metals within contaminated water and the microbial populations' inability to establish and maintain pH to prevent resolublization of the metals. Chemical neutralization of acidic solutions is a basic chemical reaction that is a well known process and is routinely used in water treatment solutions and acid mine drainage treatment systems. However, chemical neutralization is inefficient in removing metals over an extended period of time due to a need to continuously add chemicals to balance the pH.

Chitosan is a deacetylated derivative of chitin that that exhibits chelating properties. Differing degrees of chitin deacetylation exhibit different chelating capacity. The greater amount of deacetylation, the greater the chelating properties.

U.S. Pat. No. 7,138,059 issued to Sorenson et al. (Nov. 21, 2006) discloses addition of organic carbon, such as chitin complex for bioremediation. The full content of the '059 patent is hereby incorporated into this disclosure by reference. Although the '059 patent discloses using chitin as an electron donor to facilitate bioremediation of environmental contaminants, it does not contemplate adding the chitin in an amount sufficient to increase the pH of an acidic contaminated medium to an extent that would increase metal precipitation from the contaminated medium. The systems disclosed in the '059 patent are also limited by their inability to increase or maintain initial pH conditions to support the growth of sulfate reducing microbes for a sufficient period of time to allow for the establishment of facultative microbial populations capable of biologically isolating the sources of metals and minerals associated with MIW.

SUMMARY

The present disclosure teaches an improved method and a system using a chitin-containing material to overcome some of the problems outlined above. More particularly, it is hereby disclosed a method and a system for remediation of a contaminated medium containing at least one contaminant. The method may comprise the addition of an effective amount of the chitin complex-containing material to the contaminated medium, said effective amount being an amount of the chitin complex-containing material that is sufficient to cause separation of substantial amount of said at least one contaminant from the contaminated medium, said contaminant being at least one member selected from the group consisting of a metal, an acid-forming mineral and combinations thereof.

Reductive-oxidation potential is a measure of the affinity of a substance for electrons, as is commonly known in the art. Standard reductive-oxidtion potential (also known as redox potential, or oxidation/reduction potential or ORP) is the tendency of a chemical species, such as a contaminated medium, to acquire electrons and thereby be reduced. The more positive a species' reductive-oxidation potential, the greater the species' affinity for electrons and tendency to be reduced. The reductive-oxidation potential may be expressed, for example, in volts, or millivolts. In one aspect of this disclosure, the effective amount of the chitin complex-containing material is an amount of the chitin complex-containing material that when added to said contaminated medium decreases the reductive-oxidation potential of the medium. Preferably, the reductive-oxidation potential of the contaminated medium is reduced by at least 50 millivolts.

In another embodiment, the effective amount is an amount of the chitin complex-containing material that is sufficient to cause the pH value of the contaminated medium to increase by at least one standard pH unit. Preferably, the change in pH takes effect within 48 hours after the addition of said chitin complex-containing material into the contaminated medium. More preferably, the change in pH takes effect within 24 hours after the addition.

In another embodiment, the effective amount of the chitin complex-containing material is an amount that when added to the contaminated medium increases the alkalinity of the contaminated medium by at least 10 milligrams per liter (mg/L).

Suitable chitin complex-containing material may include carbon sources that are rich in chitin, such as ChitoRem® chitin complex, crustacean meal (such as crab meal, lobster meal, and shrimp meal), arthropods, fungi, yeast cells, fungal or yeast fermentation broth or the like. The chitin-containing crustacean meal may be deproteinized crustacean shell, partially deproteinized crustacean shell or the like. ChitoRem® chitin complex is a series of chitin-containing products available from JRW Bioremediation, LLC (Lenexa, Kans.), and may include but are not limited to SC20®, SC40®, and SC80®. For purpose of this disclosure, such chitin containing materials or carbon sources may be referred to as chitin complex, or chitin complex-containing material.

In another embodiment, the effective amount may be an amount of the chitin complex-containing material that when added to said contaminated medium helps precipitate substantial amounts of the metal out of the medium, or helps inhibit the resolubilization of the metal into the contaminated medium. Besides its role in precipitating metals, chitin complex may promote biological growth in the contaminated medium, which, in turn, isolates the metals and minerals from contact with oxygen for an extended period of time. As shown in the example, the addition of chitin complex results in a faster increase in pH and a longer lasting carbon source than more traditional substrates such as mushroom mulch or soluble carbon substrates.

In another embodiment, the present disclosure provides a method for removing metals from surface and subsurface water through the addition of various forms of a combination of slowly soluble and readily soluble carbon sources. In one aspect, chitin complex may be used as a slowly soluble biopolymer and may be mixed with more readily soluble protein, minerals and their derivatives or combinations thereof.

In one aspect, the methodology is designed to efficiently treat metals and acidic conditions associated with water exposed to soil and rock at and around active and/or abandoned mines and commonly referred to as MIW. More generally, the methodology is effective on any water containing metals. In another aspect, the disclosed process reduces the rate of release of dissolved metals and acid causing materials from rock, soil, and/or debris through the establishment and maintenance of sulfate reducing and facultative biological films that isolates said rock, soil, and/or debris from oxygen and other oxidizing materials.

Biological agents may be used to facilitate the remediation process. Some contaminated medium may contain biological agents that can facilitate the degradation or separation of the contaminants from the medium. Alternatively, one or more biological agents may be added to the contaminated medium before, during, or after addition of the chitin-containing materials. Such biological agents may include, for example, indigenous and non-indigenous microorganisms such as nitrate-metabolizing, metal-metabolizing, or sulfate reducing microbial populations. One example of metal-metabolizing microbes is *Thiobacillus ferroxidans*.

In another aspect, the remediation process disclosed herein may be an abiotic process wherein the contaminants are remediated by chemical and/or physical processes. Under such conditions, the effective amount may be an amount of the chitin complex-containing material that when added to the contaminated medium promotes the sorption of the contaminant from the contaminated medium, increase the pH of the contaminated medium by at least one standard pH unit, or increase the alkalinity of the contaminated medium by at least 10 milligrams per liter.

The presently disclosed methods may be practiced in situ where the remediation agents such as the chitin containing materials may be added directly to a contaminated medium on site. In another aspect, the remediation agents may be added ex situ by adding the remediation agents into an engineered system containing the contaminated medium. Examples of such an engineered system may include but are not limited to a parcel of engineered anaerobic wetland, a parcel of engineered aerobic wetland, a subsurface bioreactor, a water treatment system bioreactor, and combinations thereof. An engineered wetland is a specifically designed semi-aquatic enclosure where aerobic or anaerobic conditions can be created and maintained using plants and/or microbes (including fungi). A bioreactor refers to a vessel with at least one living organism which is capable of mediating or participating in certain biochemical reactions, such as, for example, a bioremediation reaction.

By way of example, the chitin complex-containing material may be added directly in a water treatment system, onto the surface, or through direct injection of the materials into the subsurface, or placement of the material into bore holes, pits, or trenches, in active and/or abandoned mines, shafts, access ways, tunnels, and/or the through the passive introduction of the material into the environment. In cases where the contaminated medium is held in a space that may be difficult to access, the chitin materials may be added into the space through a conduit selected from the group consisting of a boring, a hole, a trench, an excavation and combinations thereof.

The disclosed methods and materials may be applicable to contaminant sources such as water, other liquids, solids or gaseous wastes that contain chemicals potentially harmful to human health or the environment in general. Such chemicals may include but are not limited to metals, minerals, nitrate, sulfates, acid mine drainage, or radioactive materials.

The chitin-containing materials may be useful as chemical bases to raise the pH of highly acidic remediation targets. These materials may also provide nitrogen for biological growth and provide both immediately available and slowly available electron donors for environmental bioremediation of metals and minerals. Chitin complex may also stimulate the metabolism of microbial consortia to reduce the concentrations of contaminating minerals and metals.

In another aspect of the present disclosure, nutrient such as yeast metabolite may be added to the contaminated medium for increasing the metabolic kinetics of the microorganisms.

The following study demonstrates the effectiveness of chitin complex in reducing the concentrations of dissolved metals and minerals in MIW.

DETAILED DESCRIPTION

Figure 1:
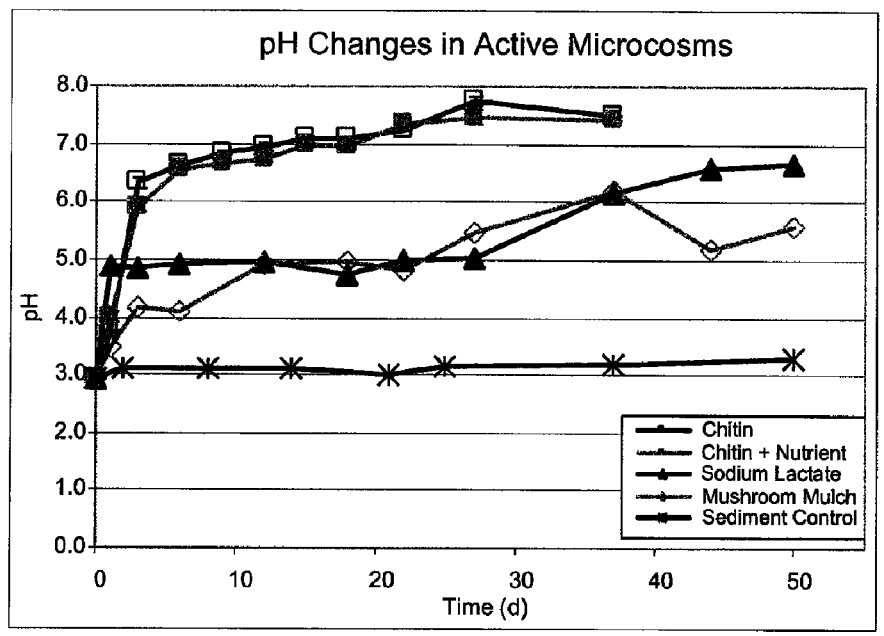
FIG. 1 shows the rapid increase in pH in the Active microcosms containing chitin complex and chitin complex+Nutrients relative to the microcosms containing Mushroom Mulch, Sodium Lactate, and the Sediment Control.
Figure 2:
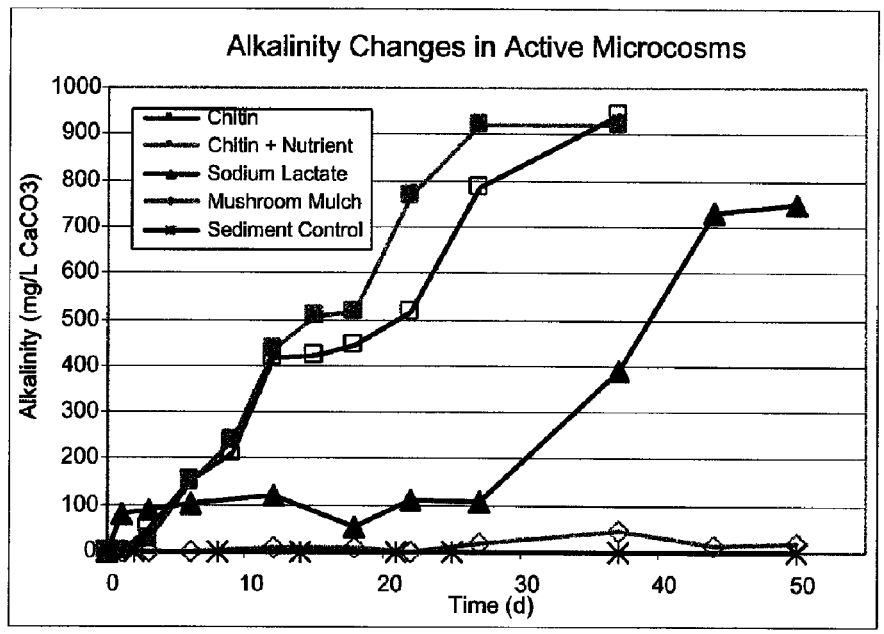
FIG. 2 shows the rapid increase in dissolved alkalinity (as measured as $CaCO_3$) in the Active microcosms containing chitin complex and chitin complex+Nutrients relative to the microcosms containing Mushroom Mulch, Sodium Lactate, and the Sediment Control.
Figure 3:
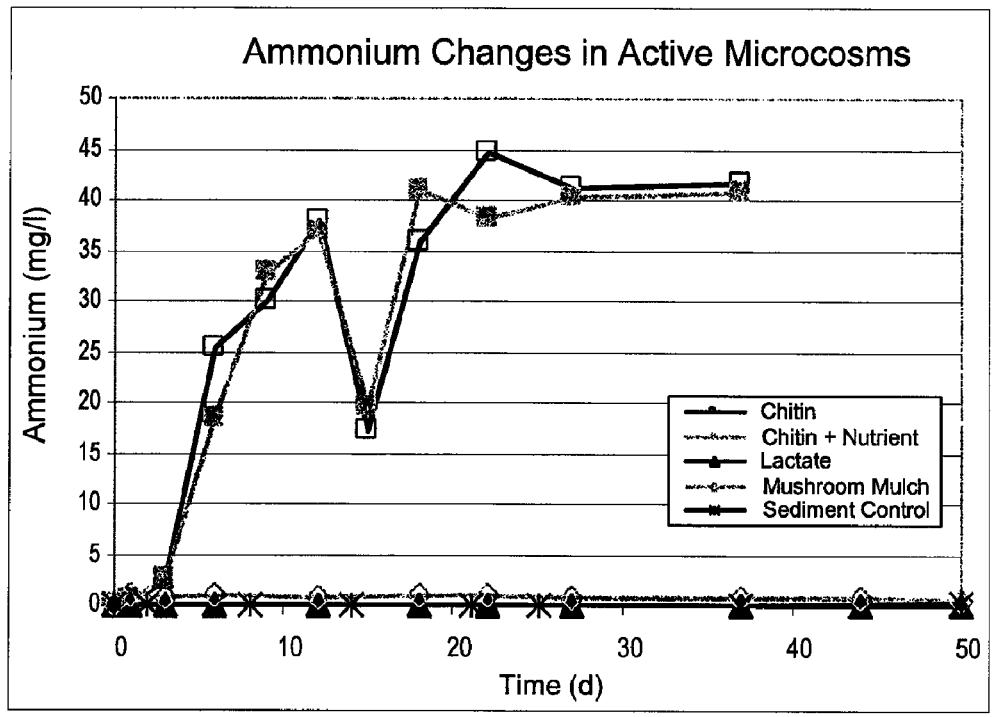
FIG. 3 show the rapid increase in ammonia in the Active microcosms containing chitin complex and chitin complex+Nutrients relative to the microcosms containing Mushroom Mulch, Sodium Lactate, and the Sediment Control.
Figure 4:
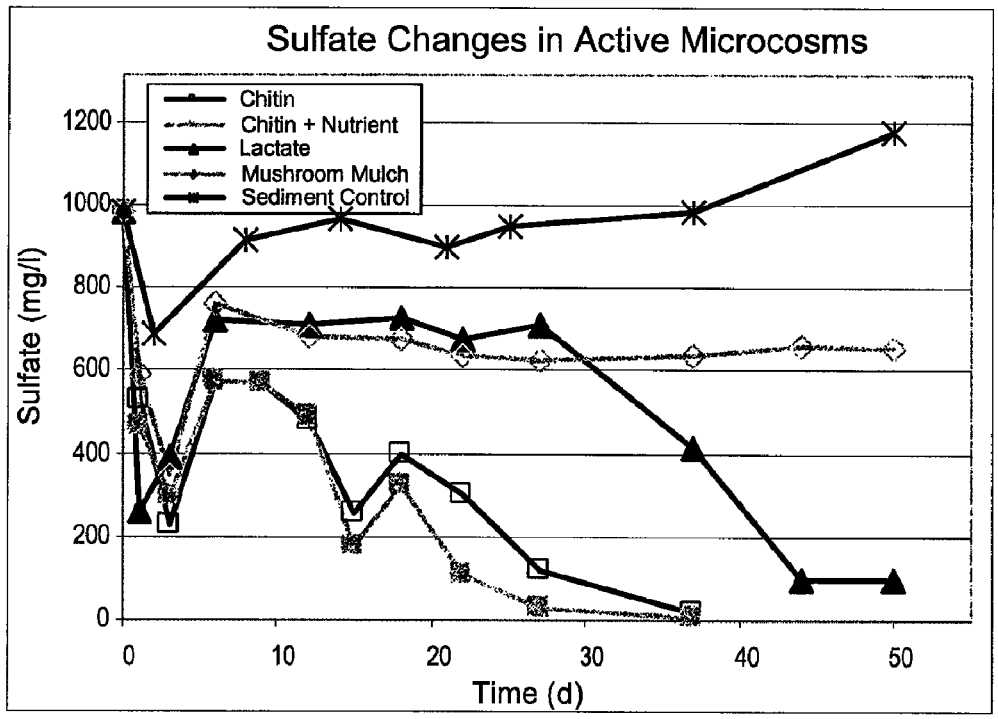
FIG. 4 shows the rapid decrease in sulfate in the Active microcosms containing chitin complex and chitin complex+Nutrients relative to the microcosms containing Mushroom Mulch and Sodium Lactate.

The present disclosure provides a chitin-containing material that may act as a chemical base to initially increase pH of a contaminated medium for removal of contaminants such as dissolved metals. The chitin containing material may also promote microbial growth by providing nutrients and act as a carbon source to maintain microbial growth for a sufficient period of time to allow for the establishment of a biomass capable of isolating the metals and minerals within the formation from oxygen. The biomass may contain microbes such as sulfate reducing bacteria, facultative bacteria, or aerobic bacteria. In addition, the increased pH may reduce the biological conversion of insoluble forms of metal to soluble forms of metal by certain metal metabolizing organisms.

The term bioremediation as used here generally refers to the transformation of a contaminant by using biological agents to convert the material to less toxic forms. Such biological agents may include, for example, fungi, yeast, mold, bacteria such as sulfate reducing bacteria, and other organisms capable of converting certain ingredients in a contaminated medium into environmentally friendly components. These agents preferably are capable of metabolizing chitin as a carbon source through one or more metabolic processes. Such metabolic processes may include but are not limited to direct oxidation, anaerobic fermentation, facultative degradation, or anaerobic reduction. In the case of sulfate, specific reducing bacteria may metabolize the sulfate into sulfide using the carbon from the chitin as an electron donor and the sulfate as an electron acceptor. Microbes that grow on and around the pyritic rock that is generally the source of MIW may also act as a biological barrier breaking the acid production cycle by preventing oxygen from coming into contact with the pyrite. The term "abiotic" is used to refer to a remediation process that does not rely primarily on the action of biological agents described above to remediate a contaminated medium.

The term "acid-forming mineral" refers to minerals such as sulfur that when exposed to environmental factors such as air, light, water, heat, erosion, etc., may be gradually converted into certain forms of acids.

chitin complex may raise the low pH typically found in MIW through two mechanisms, 1) through the addition of a chemical base from the carbonates contained in chitin complex and 2) through the biological production of carbonates during metabolism. The calcium carbonate in the chitin complex may react with the acid in MIW thereby raising the pH in a short period of time. Microcosm studies have shown an increase of two or more standard pH units within 48 hours, for instance, from pH 2 to pH 4. Other metabolic processes produce carbon dioxide that may dissolve in water generating carbonate minerals that may increase alkalinity and buffer the system from further release of acid. This increase in alkalinity will remain in effect as long as sufficient carbon is available within the system.

An increase in pH typically lowers the solubility of metals in an aqueous solution thereby reducing the dissolved metals content by precipitating excess metals from the contaminated medium. The metabolism of sulfate reducing bacteria may also reduce dissolved metals concentrations by promoting the formation of metal sulfides. This can be done at low to moderate pH under anaerobic conditions.

Chitin may further reduce dissolved metal through abiotic activity at low to moderate pH ranges. This property is manifest in a dramatic initial decrease in dissolved iron followed by an increase before biological processes can become effective. Chitin may also have absorptive properties capable of entrapping metals and metal compounds within the chitin matrix. These absorptive properties impact the concentration of other metals and minerals within MIW to varying degrees.

The microcosm system for showing the effectiveness of bioremediation of MIW contaminated groundwater may include, for example, the following components:
  160 ml stoppered serum bottles
  100 ml of MIW water
  Nominally 0.5 gram of non-sterile soil from a marsh near Kittanning Run in Altoona, Pa.
  0.25 grams (gm) of various electron donor
  0.0156 gram (g) nutrient "Contaminated medium" refers to any materials which may contain toxic, radioactive or otherwise undesirable elements, compounds, or physical properties known or suspected to be hazardous to human health or the environment. The physical state of the contaminated medium may be liquid, colloid, gas, solid, suspension, slurry, or combinations thereof. For purpose of this disclosure, the contaminated medium may be ground water, or it may be an aqueous medium other than ground water. The term "acidic" is used to indicate that the pH value of a material is less than 7.0 standard units. In one embodiment, the acidic contaminated medium has a pH lower than 7.0 before addition of any bioremediation component, including, for example, the chitin-containing material. In another embodiment, the medium has a pH lower than 3.5 before the addition of the chitin complex-containing material. In another aspect, the pH of the non-ground-water aqueous medium may be equal to or higher than 7.0. In one aspect of this disclosure, the acidic contaminated medium contains at least one metal. In another aspect, the acidic contaminated medium contains at least one mineral.

In a preferred embodiment, the contaminated medium is MIW water, which refers to any aqueous solution or water that is chemically impacted by exposure to rock and/or soil associated with any subsurface activity including the exploration, removal, or processing of minerals or other substances. The process by which MIW is generated is generally referred to as leaching. The MIW used in the example generally contained the following analytes:

| TYPICAL ANALYSIS: | |
|---|---|
| pH | 2.95 |
| Hot Acidity (milligrams per liter (mg/L) as $CaCO_3$) | 153 |
| Alkalinity (mg/L as $CaCO_3$) | 0.0 |
| Aluminum (mg/L) | 10.0 |
| Iron (mg/L) | 10.0 |
| Manganese (mg/L) | 15.0 |
| Sulfate (mg/L) | 980 |

This MIW was collected from the Kittanning Run in Altoona, Pa. about 2.7 mikes downstream of the nearest coal mine.

The microcosm study used in the examples is intended to approximate typical MIW conditions at or near the subsurface. In order to provide an example of a naturally occurring microbial population, non-sterile soil was added to each microcosm bottle.

Microbes that metabolize iron may also play a role in the overall leaching process. For instance, a bacterium thought to be widely distributed in the environment and identified as *Thiobacillus ferroxidans* has been reported to dramatically accelerate the iron conversion rate (Singer and Stumm, 1970; Nordstrom, 1979). These bacteria are most active at a pH range between 2 and 3. As acid-producing minerals are leached from the rock and/or soil, the background pH begins to drop thereby favoring the metabolism of microbes such as *Thiobacillus ferroxidans*. This increase in metabolic rate under low pH conditions accelerates the conversion of iron from an insoluble form to a soluble form thereby increasing the overall reaction rate. At higher pH values, for example, at pH greater than about 3.5, these low pH microbes may become less active and therefore may contribute less to the iron leaching process (Kleinmann et al., 1981 and Nordstrom, 1979).

Sulfate reducing microbes may also play an important role in MIW treatment. These microbial populations utilize acid generating protons from the water and combine them with carbon from a substrate to produce alkaline bicarbonate (Song Jin, Ph.D., C.H.M.M., Western Research Institute, 2007). For purpose of this disclosure, the term "alkalinity" refers to the concentration of $CaCO_3$ or its derivatives in the medium.

These microbes may be found under natural conditions at many sites. Thus, the sulfate reducing microbes may be indigenous (or native) to the contaminated medium. Alternatively, non-indigenous sulfate reducing microbes may be added to the contaminated medium. These microbes may typically be obtained from engineered anaerobic systems such as wastewater treatment plants and/or lagoons. The growth of sulfate reducing microbes produces a biomass that covers the underlying rock thereby reducing the exposure of the underlying rock to oxygen. This biomass, along with biomass generated by the growth of facultative microbes that can survive in both aerobic and anaerobic environments significantly reduces or eliminates the oxidation of underlying rock for extended periods of time after the carbon substrate has been consumed. Facultative microbes are not very active in a highly acidic environment (e.g., at pH lower than 2-3). By contrast, the growth and metabolism of facultative microbes may be significantly enhanced at a pH that is greater than 3.5.

For purposes of this disclosure, the remediation agents (also referred to as a substrate) may be a chitin-containing carbon source that may act as an electron donor and may support the growth of the biological mass in the remediation mixture. The preferred substrate contains a minimum of 0.1% by weight chitin, which may be obtained from sources such as crustacean shell, partially de-proteinized crustacean shell, ground mushrooms, or a fungal fermentation broth. Chitin (poly-N-acetylglucosamine) is one of the most ubiquitous biopolymers on earth, second only to cellulose in natural abundance. Derived primarily from crustacean shells, chitin and chitin-derived products are currently used for a variety of applications including food and cosmetics, biomedical materials, and agricultural products. More examples of chitin containing materials may be found in the literature. See generally, R. A. A. Muzzarelli, Chitin (Pergamon Press, Oxford, 1977); also see Jolles and Muzzarelli, Chitin and Chitinases (Birkhäuser, 2004). Worldwide production of chitin-derived materials is estimated to be upwards of 10 million kilograms/year. Chitin is highly biodegradable, breaking down into simple organic acids such as acetate and propionate [buterate, pyruvate and others]. As shown by its molecular formula ($C_8H_{13}NO_5$), it contains 6-7% nitrogen, giving it a carbon to nitrogen ratio ideally suited for bacterial growth. In addition, as a porous solid, chitin provides both a support for bacterial colonization and a long-term source of organic acids. Typically, the chitin is derived from natural sources, for example, shrimp, crab, lobster, or krill shells. The shells may be processed to produce chitin-derivatives. For instance, the chitin may be treated with base, for example, sodium hydroxide, to deproteinize the material. The chitin may then be treated with an acid, for example, hydrochloric acid, to demineralize the material, for example, by extracting calcium carbonate and calcium phosphate. Chitin and chitin-derivatives include, but are not limited to o-acylchitin; alkalichitin such as o-alkylchitin, chitin xanthogenat, o-hydroxyalkylchitin, o-carboxymethylchitin, and o-carboxymethylchitosan; and chitosan such as n,o-carboxymethylchitosan, n-acylchitosan, n-carboxylacylchitosan, quarternized chitosan, n-alkylidenechitosan, n-alkylchitosan, n-carboxyalkylidenechitosan, and hydroxyalkylchitosan. Chitin is a solid that is insoluble in most organic solvents as well as water. Chitin and chitin-derivatives support long-term biological activity without the need to reapply the electron donor.

Throughout this disclosure, the terms "chitin-containing materials," and "chitin complex-containing materials" may be used interchangeably. Capital or small letters in a word may also be used interchangeably to refer to the same term. The chitin complex may be added to the contaminated medium as a particulate or as an aqueous slurry. Chitin is present in many organisms, such as arthropods, fungi and yeasts. Because it is present in so many different types of organisms, chitin is the second most plentiful natural polymer next to cellulose.

In arthropods, the intersegmental membranes are flexible chitinous structures. The cuticular sclerites also have the same characteristics just after molting. The bulk of the procuticle is a chitin complex and protein complex. The innermost layer of the calcified cuticle of crustacean is not calcified, but lies between the calcified procuticle and the epidermis, which has characteristics similar to those of the intersegmental membrane. The sclerites of crustaceans can be interpreted as intersegmental membranes whose procuticle is almost entirely calcified with calcium carbonate and, to a lesser degree, calcium phosphate. Calcium carbonate occurs as micro- or macro-crystals of calcite. The hardening of calcified cuticles is, however, initiated by protein sclerotization prior to deposition of calcium salts. The amount of protein in the calcified cuticle is much lower than in the flexible procuticle or in the sclerotized exocuticle of insects as a result of calcification.

In fungi, such as *Mortierella vinacea, Mucor rouxii, Phycomyces blakesleeanus*, and *Cunninghomella elegans*, chitin synthetase activity is associated with the cell wall fraction. In other organisms, however, the enzyme was found to be located mainly in the mitochondrial and microsomal fractions. The difficulty of removing the chitin synthetase from the cell wall fractions of *Mortierella vinacea*, or *Mucor rouxii* suggests that the enzyme is bound to the cell wall. In the yeast, *Saccharomyces cerevisiae*, chitin is found in the primary septum of the cell wall, which occurs at bud scars. The genus of *Aspergillus* and related fungi are also important sources of chitin.

Chitin refers to a polymer of N-acetylglucosmine, while the term chitosan refers to a deacetylation product obtained from chitin where most of the acetyl groups have been removed. Experimentally, chitosan can be distinguished from chitin because of its solubility in dilute acetic or formic acid. Pure chitin also contains 7% or more nitrogen. The amino groups of chitin and chitosan are exceptionally stable in 50% sodium hydroxide, even at high temperature. Glucosamine occurs as an essential part of the polymer structure. Elemental analysis of chitin samples reveal that they bind with water tenaciously.

Chitin and chitosan are both biodegradable and non-toxic, and they have binding properties such that they may function as excellent flocculants for clarifying liquids, they may also help heal wounds. Chitin and chitosan may be fabricated into strong permeable films, and function as drug-delivery gels for topical application of a variety of medications. It has also been determined that chitin may be used as an electron donor in bioremediation of organic contaminants in the environment.

Chitin and chitosan are generally refined from the waste products of the crab, lobster, and shrimp industries, but can also be produced from the processing of wastes from arthropods, yeast and fungi. The crustacean shells are treated with a caustic wash (i.e. strong base, such as sodium hydroxide) to remove protein and other contaminants attached to the shells. The resulting intermediate, which is primarily composed of chitin, mineral complexes (primarily calcium carbonates), and water, is then washed with water to remove residual base. Next, the de-proteinized intermediate is treated with strong acid, such as hydrochloric acid, for dissolving and removing the minerals. After the minerals are washed away, the product is dried and may be ground and screened for size. The resulting refined, or "pure" chitin, typically contains greater than 94.4% chitin, 1.5% ash, and 3% caustic solubles on a dry weight basis.

ChitoRem® chitin complex is one form of the natural source materials used to produce chitin. Chitin, a condensation polymer of N-acetyl-D-glucosamine, is the structural component of the shells of crustaceans and other arthropods. In its natural form, crustacean shell typically contains 40-50% calcium carbonate, 30-40% protein, and 15-30% chitin. For most commercial applications of chitin, the protein and calcium carbonate are removed via processing with strong bases and acids, respectively. However, chitin complex is an ideal substrate for MIW and bioremediation applications, as the significant cost savings and the presence of calcium carbonate and protein components add significant biological and chemical characteristics desirable in treating MIW that are not found in pure chitin. The present invention relates to chitin-containing complexes that, in addition to chitin, contain protein and minerals. A surprising and unexpected finding of experiments with these chitin-containing complexes is that they are superior to pure chitin for pH modification and as electron donors for both short-term and long-term microbial growth. The combination of chitin, protein, calcium carbonate, and nutrients are also superior in performance as an anaerobic substrate for MIW to currently used substrates such as mushroom mulch and purified carbon substrates such as metabolic acids in the form of lactate. A more detailed description of chitin and chitin derivatives for bioremediation can be found in U.S. Pat. No. 6,589,776, issued to Harkness (Jul. 8, 2003).

In view of the foregoing, it will be appreciated that providing high-efficiency methods for carrying out bioremediation of MIW using low-cost, chitin complex-containing materials would be a significant advancement in the art.

The substrate used in the example comprises the following:

| TYPICAL ANALYSIS: | |
|---|---|
| Chitin | 10-30% |
| Protein | 5-50% |
| Calcium carbonate | 20-60% |
| Water | 10-20% |

Other substrates used in the example were 60% sodium lactate solution, mushroom mulch, and chitin complex amended with nutrients. Sodium lactate is a well known carbon substrate used in the remediation of chlorinated solvents in groundwater under a process commonly referred to as halorespiration. In this process, the lactate ion serves an electron donor that is metabolized thereby manipulating the reductive oxidation potential (redox) of contaminated systems. This change in redox promotes general biological activity including halorespiration and sulfate reduction but can also impact metals solubility as the redox condition and the pH changes as the microbial populations metabolize sulfate (thereby increasing pH through the removal of acidity) and produce alkalinity in the form of calcium carbonate. The anaerobic remediation of dissolved metals in MIW also relies on the manipulation of pH and redox to form metal precipitates which are removed from the aqueous phase. Since sodium lactate's impact on chlorinated solvent and metals remediation in ground water is well documented, it was selected as a comparative benchmark substrate.

Mushroom mulch is a common substrate used in the construction of anaerobic wetlands for more traditional biological treatment of MIW water that has reached the surface. Mushroom mulch is typically comprised of mushroom tissue and woody material used as the growth media and is considered by some to be a standard MIW anaerobic wetland material. Anaerobic wetlands are engineered biological systems that treat MIW by promoting biological sulfate-reducing (low redox) conditions and providing pH moderating capacity in the form of biologically produced alkalinity as calcium carbonate. Mushroom mulch may be used for comparative purposes to determine if it is more or less effective than the chitin complex-containing material of the present disclosure.

Nutrient may be included in the disclosed process to promote the growth of biological populations in the bioremediation mixture. For purpose of this disclosure, the term "Nutrient" may be used to refer to supplements that enhance the bioremediation reaction by promoting growth of the biological populations, and may include all nutrients taught by the U.S. patent application Ser. No. 12/049,959 filed on Mar. 17, 2008, which has been incorporated into this disclosure by reference. The preferred Nutrient is yeast products (YE), which may enhance the metabolic kinetics of the sulfate reducing and other microbes. The nutrient used in the example is a mixture of water soluble metabolites generated by fermenting yeast and a sugar source. Suitable fermenting yeast include for example, *Saccharomyces cerevisiae*. Other yeast strains capable of fermentation may be used as well. Selection and manipulation of yeast may be performed according to C. Guthrie and G. R. Fink, Guide to Yeast Genetics and Molecular Biology (Methods in Enzymology, Vol. 194), Academic Press (February 1991). Sugar sources such as corn syrup and cane molasses may be fermented utilizing a multi-step fermentation and drying process to produce YE. For the nutrient powder, sourced from Embria® Health Sciences, Inc. and sold as EpiCor® High-Metabolite Immunogens, the fermentation process water may be evaporated to obtain water soluble YE in its powder form. YE may be retained on a growth matrix for ease of handling. For the YE on matrix, this process may utilize YE sourced from JRW Bioremediation, L.L.C. and sold as Accelerite™ bioremediation nutrient. The yeast culture may be grown on cereal grain raw ingredients, in this case ground yellow corn, hominy feed, corn gluten feed, wheat middlings, rye middlings and diastatic malt may be added to the fermentation reaction and then separated and dried. The fermentation and drying processes are preferably controlled such that the yeast factors, B-vitamins and other fermentation products are not destroyed. For the experiments described here, Accelerite™ bioremediation nutrient was used.

The Physical and Chemical Properties of the nutrient used in the example are:

| TYPICAL ANALYSIS: | |
|---|---|
| Moisture | <11% |
| Protein | >25% |
| Ash | <20% |
| Fat | >0.1% |
| Total Dietary Fiber | >10% |
| ORAC Value | 450-650 |
| MICROBIOLOGY: | |
| Aerobic Plate Count | <100,000 cfu/g |
| Yeasts & Mold | <1,000 cfu/g |
| Total Coliforms | n.d.* |
| Staph. Aureus | n.d.* |
| Pseudomonas aeruginosa | n.d.* |
| Salmonella sp. | Negative |
| HEAVY METALS: | |
| Arsenic (As) | <1 mcg/g |
| Cadmium (Cd) | <1 mcg/g |
| Lead (Pb) | <1 mcg/g |
| Mercury (Hg) | <1 mcg/g |

In order to assess the effect of the nutrient on the bioremediation of MIW, the reactions may be carried out with or without nutrient and the results may be measured. In the case of the nutrient on insoluble grain matrix, the nutrient may be added at the rate of 0.0156 grams per 100 ml water along with substrate and then degassed with nitrogen for 10 minutes to remove oxygen. Degassed MIW water can then be transferred to the bottle in 100 ml aliquots and then sealed with butyl rubber stoppers and aluminum crimp tops.

The rate of metals removal from the contaminated medium may be determined as the change in metal concentration over a period of time, and may be calculated follows:

Rate=(Starting Metals Concentration-End Metals Concentration)/time

In one aspect, the disclosed methodology is particularly suitable for treating acid contaminated medium. For purpose of the present disclosure, an effective amount of the chitin complex material may be the amount that may cause a significant increase of the pH value of the contaminated medium and a significant reduction in dissolved metals concentrations. Preferably, the pH of the contaminated medium is over 3.5 after the chitin complex-containing material is added and mixed with the contaminated medium. The increase in pH may result in precipitation of substantial amount of metals out of the contaminated medium. The term "separation" (or "separate"), as used herein, refers to a state of being set apart through either a chemical or a physical process, or both. Chemical separation of a contaminant from a medium may occur when the contaminant is set apart from the rest of the medium through a chemical reaction. Common types of physical separation include, for example, physical division of phases, such as separation of solid from liquid, or differential binding of a contaminant to a fixed phase, such as a matrix. The term "precipitate" (or "precipitation") refers to the process by which the solubility of a solute in a solvent decreases which causes the solute to be separated from the solvent as a solid.

As used here, the term "substantial" is used to describe a situation wherein the concentration of a contaminant, such as a metal in the contaminated medium is decreases by at least 20%. Preferably, this decrease in concentration occurs during the first 48 hours after the chitin-containing material is added to and mixed with the contaminated medium. More preferably, the decrease in contaminant concentration may be 40% or greater during the first 24 hours of mixing.

The following example illustrates the present invention. This example is provided for purposes of illustration only and is not intended to be limiting. The chemicals and other ingredients are presented as typical components or reactants, and various modifications may be derived in view of the foregoing disclosure within the scope of this disclosure.

EXAMPLE

Various components for the bioremediation reactions described in the Example are as described in the Materials Section unless otherwise specified therein. Each specific formulation was run in duplicate and each bottle was sampled for aluminum, iron, manganese, and zinc at several different times. The number of points and times of the sampling were selected such that the changes in the concentrations of metals and the possible long term effects of the various substrates or components may be monitored. In all cases each bottle was started with the same concentrations of metals of 10.0 parts per million (ppm) aluminum, 10.0 ppm iron, 15 ppm manganese, and 0.63 ppm zinc. Some of the substrates exhibited minimal changes between sampling events therefore the time between events was extended thereby extending the duration of the example for some, but not all, of the substrates.

Active (live) microcosms contained 0.5 g sediment and 100 ml anoxic MIW water. The Kill Control microcosms contained 0.5 g sediment and 100 ml anoxic MIW water and 5 ml 37% formaldehyde solution. These Kill Controls were prepared to assist in identifying the abiotic impact of each substrate on MIW. A complete listing of the substrates is as follows:

Sodium Lactate Benchmark (0.25 g sodium lactate)
chitin complex (0.25 g chitin)
chitin complex (0.25 g chitin)+Nutrient (0.0156 g nutrient)
Mushroom Mulch (0.24 g mushroom compost)
Sediment Control (sediment and MIW water, no substrate or formaldehyde)
Kill Controls (formaldehyde sterilized sodium lactate, chitin complex, chitin complex+nutrient, Mushroom Mulch, Sediment Control)

The objective of this study was to characterize the impact of different substrates on MIW and to determine the contributory impact of chemical and biological functions on the removal of metals from MIW.

The MIW water used in the examples was collected from Kittanning Run in Altoona, Pa. approximately 2.7 miles downstream of the nearest coal mine. The soil sediment used in this example was collected from a marsh near Kittanning Run in Altoona, Pa., approximately 2.7 miles downstream of the nearest coal mine.

The study was conducted using microcosms containing viable indigenous microbes with Sodium Lactate, Mushroom Mulch, chitin complex, chitin complex+Nutrient, and Sediment (as a control). These viable microcosms are referred to as "Active" or "A-" preceding the corresponding substrate in the tables and figures. In order to determine the abiotic contribution of each substrate, a second series of microcosms that were chemically treated with formaldehyde were studied. The addition of formaldehyde was intended to sterilize these microcosms or at a minimum, dramatically retard the microbial growth. These non-viable microcosms are referred to as "Kill Control" or "K-" preceding the corresponding substrate in the tables and figures. In addition, a "Sediment Control" microcosm was studied. This Sediment Control contained MIW water and sediment but did not include any substrate, nutrient, or formaldehyde.

Tables 1 and 2 present soluble iron concentration data in the Active and Kill Control microcosms:

TABLE 1

Dissolved Iron Concentration
Active Microcosms

| Day | Sodium Lactate Iron (mg/L) | Mushroom Mulch Iron (mg/L) | chitin complex Iron (mg/L) | chitin complex + Nutrient Iron (mg/L) |
|---|---|---|---|---|
| 0  | 10.00 | 10.00 | 10.00 | 10.00 |
| 1  | 10.20 | 6.40  | 1.10  | 2.60  |
| 3  | 10.20 | 0.58  | 0.29  | 0.64  |
| 6  | 9.65  | 4.43  | 1.50  | 2.55  |
| 9  | —     | —     | 2.00  | 3.45  |
| 12 | 12.15 | 0.09  | 0.75  | 2.15  |
| 15 | —     | —     | 1.45  | 0.37  |
| 18 | 12.00 | 0.00  | 0.80  | 0.39  |
| 22 | 10.40 | 6.70  | 0.00  | 0.00  |
| 27 | 16.00 | 0.00  | 0.00  | 0.00  |
| 37 | 15.56 | 36.00 | 0.00  | 0.00  |

— Not measured

TABLE 2

Dissolved Iron Concentration
Kill Control Microcosms

| Day | Sodium Lactate Kill Control Iron (mg/L) | Mushroom Mulch Kill Control Iron (mg/L) | chitin complex Kill Control Iron (mg/L) | chitin complex + Nutrient Kill Control Iron (mg/L) | Sediment Control Iron (mg/L) |
|---|---|---|---|---|---|
| 0  | 8.30 | 8.30 | 8.30 | 8.30 | 10.00 |
| 2  | 8.50 | 2.45 | 0.66 | 1.40 | 5.75  |
| 8  | 7.95 | 0.70 | 0.02 | 0.14 | 4.00  |
| 14 | —    | —    | 0.00 | 0.00 | 0.88  |
| 21 | 8.20 | 0.63 | —    | —    | 0.60  |
| 25 | —    | —    | 0.00 | 0.00 | —     |
| 37 | 6.30 | 0.09 | 0.00 | 0.00 | 0.42  |

— Not measured

Tables 3 and 4 present dissolved aluminum concentration data in the Active and Control microcosms:

TABLE 3

Dissolved Aluminum Concentration
Active Microcosms

| Day | Sodium Lactate Aluminum (mg/L) | Mushroom Compost Aluminum (mg/L) | chitin complex Aluminum (mg/L) | chitin complex + Nutrient Aluminum (mg/L) |
|---|---|---|---|---|
| 0  | 10.00 | 10.00 | 10.00 | 10.00 |
| 1  | 8.80  | 7.85  | 4.45  | 5.60  |
| 3  | 8.40  | 4.90  | 0.00  | 0.00  |
| 6  | 8.65  | 2.75  | 0.00  | 0.00  |
| 9  | —     | —     | 0.00  | 0.00  |
| 12 | 7.50  | 0.00  | 0.00  | 0.00  |
| 15 | —     | —     | 0.00  | 0.00  |
| 18 | 7.50  | 0.00  | 0.00  | 0.00  |
| 22 | 7.50  | 0.00  | 0.00  | 0.00  |
| 27 | 7.00  | 0.00  | 0.00  | 0.00  |
| 37 | 2.50  | 0.00  | 0.00  | 0.00  |

— Not measured

TABLE 4

Dissolved Aluminum Concentration
Kill Control Microcosms

| Day | Sodium Lactate Kill Control Aluminum (mg/L) | Mushroom Compost Kill Control Aluminum (mg/L) | chitin complex Kill Control Aluminum (mg/L) | chitin complex + Nutrient Kill Control Aluminum (mg/L) | Sediment Control Aluminum (mg/L) |
|---|---|---|---|---|---|
| 0  | 7.20 | 7.20 | 7.20 | 7.20 | 10.00 |
| 2  | 6.60 | 4.50 | 0.00 | 0.70 | 9.25  |
| 8  | 6.60 | 1.90 | 0.00 | 0.00 | 9.95  |
| 14 | —    | —    | 0.00 | 0.00 | —     |
| 21 | 5.00 | 1.00 | —    | —    | 9.50  |
| 25 | —    | —    | 0.00 | 0.00 | —     |
| 37 | 5.00 | 0.00 | 0.00 | 0.00 | 10.50 |

— Not measured

Tables 5 and 6 present dissolved manganese concentration data in the Active and Control microcosms:

TABLE 5

Dissolved Manganese Concentration
Active Microcosms

| Day | Sodium Lactate Manganese (mg/L) | Mushroom Compost Manganese (mg/L) | chitin complex Manganese (mg/L) | chitin complex + Nutrient Manganese (mg/L) |
|---|---|---|---|---|
| 0  | 15.00 | 15.00 | 15.00 | 15.00 |
| 1  | 13.50 | 14.00 | 13.00 | 12.50 |
| 3  | 13.50 | 13.50 | 9.65  | 11.00 |
| 6  | 15.00 | 15.00 | 8.15  | 9.55  |
| 9  | —     | —     | 8.75  | 9.45  |
| 12 | 16.00 | 16.50 | 8.15  | 9.30  |
| 15 | —     | —     | 8.10  | 8.15  |
| 18 | 17.00 | 16.00 | 7.00  | 7.65  |
| 22 | 16.00 | 16.50 | 6.00  | 5.50  |
| 27 | 17.00 | 16.50 | 4.45  | 5.10  |
| 37 | 14.50 | 15.50 | 4.00  | 4.50  |

— Not measured

TABLE 6

Dissolved Manganese Concentration
Kill Control Microcosms

| Day | Sodium Lactate Kill Control Manganese (mg/L) | Mushroom Compost Kill Control Manganese (mg/L) | chitin complex Kill Control Manganese (mg/L) | chitin complex + Nutrient Kill Control Manganese (mg/L) | Sediment Control Manganese (mg/L) |
|---|---|---|---|---|---|
| 0 | 13.00 | 13.00 | 13.00 | 13.00 | 15.00 |
| 2 | 11.00 | 11.00 | 9.20 | 10.45 | 15.00 |
| 8 | 12.50 | 11.00 | 6.85 | 7.30 | 15.00 |
| 14 | — | — | 4.55 | 4.95 | — |
| 21 | 12.5 | 13.00 | — | — | 19.00 |
| 25 | — | — | 3.75 | 3.70 | — |
| 37 | 11.00 | 11.50 | 2.50 | 3.00 | 17.50 |

— Not measured

Tables 7 and 8 present dissolved zinc concentration data in the Active and Control microcosms:

TABLE 7

Dissolved Zinc Concentration
Active Microcosms

| Day | Sodium Lactate Zinc (mg/L) | Mushroom Compost Zinc (mg/L) | chitin complex Zinc (mg/L) | chitin complex + Nutrient Zinc (mg/L) |
|---|---|---|---|---|
| 0 | 0.63 | 0.63 | 0.63 | 0.63 |
| 1 | 0.45 | 0.47 | 0.45 | 0.45 |
| 3 | 0.46 | 0.43 | 0.14 | 0.28 |
| 6 | 0.48 | 0.37 | 0.04 | 0.08 |
| 9 | — | — | 0.00 | 0.06 |
| 12 | 0.34 | 0.25 | 0.00 | 0.03 |
| 15 | — | — | 0.00 | 0.00 |
| 18 | 0.50 | 0.23 | 0.00 | 0.00 |
| 22 | 0.46 | 0.10 | 0.00 | 0.00 |
| 27 | 0.39 | 0.05 | 0.00 | 0.00 |
| 37 | 0.06 | 0.00 | 0.00 | 0.00 |

— Not measured

TABLE 8

Dissolved Zinc Concentration
Kill Control Microcosms

| Day | Sodium Lactate Kill Control Zinc (mg/L) | Mushroom Compost Kill Control Zinc (mg/L) | chitin complex Kill Control Zinc (mg/L) | chitin complex + Nutrient Kill Control Zinc (mg/L) | Sediment Control Zinc (mg/L) |
|---|---|---|---|---|---|
| 0 | 0.79 | 0.79 | 0.79 | 0.79 | 0.63 |
| 2 | 0.39 | 0.35 | 0.28 | 0.31 | 0.53 |
| 8 | 0.43 | 0.29 | 0.11 | 0.22 | 0.52 |
| 14 | — | — | 0.00 | 0.00 | — |
| 21 | 0.33 | 0.37 | — | — | 0.47 |
| 25 | — | — | 0.00 | 0.00 | — |
| 37 | 0.25 | 0.18 | 0.00 | 0.00 | 0.52 |

— Not measured

Tables 9 and 10 present pH data in the Active and Control microcosms:

TABLE 9

Change in pH
Active Microcosms

| Day | Sodium Lactate pH | Mushroom Compost pH | chitin complex pH | chitin complex + Nutrient pH |
|---|---|---|---|---|
| 0 | 2.92 | 2.95 | 2.95 | 2.95 |
| 1 | 4.89 | 3.49 | 3.76 | 4.00 |
| 3 | 4.86 | 4.16 | 6.32 | 5.91 |
| 6 | 4.94 | 4.10 | 6.62 | 6.57 |
| 9 | — | — | 6.84 | 6.67 |
| 12 | 4.98 | 4.91 | 6.96 | 6.74 |
| 15 | — | — | 7.08 | 6.98 |
| 18 | 4.76 | 4.96 | 7.11 | 6.94 |
| 22 | 5.01 | 4.81 | 7.26 | 7.34 |
| 27 | 5.04 | 5.48 | 7.75 | 7.47 |
| 37 | 6.16 | 6.20 | 7.50 | 7.42 |

— Not measured

Tables 10, 12, 14, and 16 present the changes in pH, dissolved alkalinity, and sulfate in the Kill Control samples. Ammonia was not measured in the Kill Control samples. Through the first two days, the Kill Controls showed similar changes in pH when compared with the active microcosms. After 2 days, the chitin complex and the chitin complex+Nutrient kill control microcosms showed similar but less dramatic increases in pH when compared to the active microcosms. The Sodium Lactate and Mushroom Mulch Kill Control kill control microcosms showed minimal increases in pH after 2 days.

TABLE 10

Change in pH
Kill Control Microcosms

| Day | Sodium Lactate Kill Control pH | Mushroom Compost Kill Control pH | chitin complex Kill Control pH | chitin complex + Nutrient Kill Control pH | Sediment Control pH |
|---|---|---|---|---|---|
| 0 | 2.95 | 2.95 | 2.95 | 2.95 | 2.95 |
| 2 | 4.85 | 3.95 | 5.48 | 5.00 | 3.12 |
| 8 | 4.79 | 4.51 | 6.72 | 6.48 | 3.13 |
| 14 | 4.76 | 4.06 | 7.22 | 7.31 | 3.11 |
| 21 | — | — | — | — | 3.01 |
| 25 | 4.93 | 5.10 | 7.44 | 7.53 | 3.14 |
| 37 | — | — | 7.72 | 7.51 | 3.20 |

— Not measured

Tables 11 and 12 present alkalinity data in the Active and Control microcosms as measured as calcium carbonate ($CaCO_3$);

TABLE 11

Change in Alkalinity
Active Microcosms

| Day | Sodium Lactate $CaCO_3$ (mg/L) | Mushroom Compost $CaCO_3$ (mg/L) | chitin complex $CaCO_3$ (mg/L) | chitin complex + Nutrient $CaCO_3$ (mg/L) |
|---|---|---|---|---|
| 0 | 0.0 | 0.0 | 0.0 | 0.0 |
| 1 | 82.0 | 0.0 | 0.0 | 0.0 |
| 3 | 89.5 | 0.0 | 51.1 | 28.3 |
| 6 | 102.5 | 0.0 | 154.2 | 149.9 |
| 9 | — | — | 209.5 | 238.5 |
| 12 | 121.5 | 8.2 | 415.5 | 434.5 |
| 15 | — | — | 421.0 | 508.5 |
| 18 | 53.0 | 8.5 | 443.5 | 514.0 |
| 22 | 110.0 | 1.5 | 514.9 | 764.7 |
| 27 | 105.5 | 17.5 | 785.5 | 918.0 |
| 37 | 389.9 | 43.3 | 941.5 | 920.9 |

— Not measured

TABLE 12

Change in Alkalinity
Kill Control Microcosms

| Day | Sodium Lactate Kill Control $CaCO_3$ (mg/L) | Mushroom Compost Kill Control $CaCO_3$ (mg/L) | chitin complex Kill Control $CaCO_3$ (mg/L) | chitin complex + Nutrient Kill Control $CaCO_3$ (mg/L) | Sediment Control $CaCO_3$ (mg/L) |
|---|---|---|---|---|---|
| 0 | 0.0 | 0.0 | 0.0 | 0.0 | 0.0 |
| 2 | 85.0 | 0.0 | 16.5 | 6.2 | 0.0 |
| 8 | 80.5 | 3.4 | 80.5 | 66.9 | 0.0 |
| 14 | 85.5 | 0.0 | 144.0 | 131.3 | 0.0 |
| 25 | 108.5 | 8.1 | 154.6 | 156.8 | 0.0 |

— Not measured

Tables 13 and 14 present ammonia concentration data in the Active and Kill Control microcosms:

TABLE 13

Change in Ammonia
Active Microcosms

| Day | Sodium Lactate Ammonia (mg/L) | Mushroom Compost Ammonia (mg/L) | chitin complex Ammonia (mg/L) | chitin complex + Nutrient Ammonia (mg/L) |
|---|---|---|---|---|
| 0 | 0.00 | 0.04 | 0.04 | 0.04 |
| 1 | 0.00 | 0.87 | 0.27 | 0.42 |
| 3 | 0.00 | 0.76 | 2.28 | 2.47 |
| 6 | 0.00 | 0.85 | 25.42 | 18.33 |
| 9 | — | — | 30.05 | 32.68 |
| 12 | 0.00 | 0.77 | 37.79 | 36.75 |
| 15 | — | — | 17.18 | 19.60 |
| 18 | 0.00 | 0.98 | 35.92 | 40.90 |
| 22 | 0.00 | 0.88 | 44.72 | 38.15 |
| 27 | 0.00 | 0.74 | 41.07 | 40.14 |
| 37 | 0.00 | 0.62 | 41.58 | 40.75 |

— Not measured

Ammonia did not increase in the Sodium Lactate microcosm indicating that minimal, if any nitrate was being metabolized. The Mushroom Mulch microcosm showed a minimal increase in ammonia with a maximum of less than 1 mg/L. The chitin complex and chitin complex+Nutrient showed ammonia increases to over 25 and 18 mg/L at 6 days with an increase to over 40 mg/L after about 18 days.

TABLE 14

Change in Ammonia
Kill Control Microcosms

| Day | Sodium Lactate Kill Control Ammonia (mg/L) | Mushroom Compost Kill Control Ammonia (mg/L) | chitin complex Kill Control Ammonia (mg/L) | chitin complex + Nutrient Kill Control Ammonia (mg/L) | Sediment Control Ammonia (mg/L) |
|---|---|---|---|---|---|
| 0  | 0.00 | 0.00 | 0.00 | 0.00 | 0.00 |
| 2  | 0.00 | 0.00 | 0.00 | 0.00 | 0.00 |
| 8  | 0.00 | 0.00 | 0.00 | 0.00 | 0.00 |
| 14 | —    | —    | 0.00 | 0.00 | 0.00 |
| 21 | 0.00 | 0.00 | —    | —    | 0.00 |
| 25 | —    | —    | 0.00 | 0.00 | 0.00 |
| 37 | 0.00 | 0.00 | 0.00 | 0.00 | 0.00 |

— Not measured

Tables 15 and 16 present sulfate concentration data in the Active and Control microcosms:

TABLE 15

Change in Sulfate
Active Microcosms

| Day | Sodium Lactate Sulfate (mg/L) | Mushroom Compost Sulfate (mg/L) | chitin complex Sulfate (mg/L) | chitin complex + Nutrient Sulfate (mg/L) |
|---|---|---|---|---|
| 0  | 980 | 980 | 980 | 980 |
| 1  | 260 | 592 | 527 | 468 |
| 3  | 390 | 349 | 226 | 295 |
| 6  | 720 | 760 | 572 | 571 |
| 9  | —   | —   | 569 | 567 |
| 12 | 712 | 679 | 474 | 487 |
| 15 | —   | —   | 257 | 117 |
| 18 | 726 | 673 | 397 | 326 |
| 22 | 677 | 638 | 301 | 110 |
| 27 | 712 | 623 | 118 | 29  |
| 37 | 416 | 633 | 17  | 4   |

— Not measured

TABLE 16

Change in Sulfate
Kill Control Microcosms

| Day | Sodium Lactate Kill Control Sulfate (mg/L) | Mushroom Compost Kill Control Sulfate (mg/L) | chitin complex Kill Control Sulfate (mg/L) | chitin complex + Nutrient Kill Control Sulfate (mg/L) | Sediment Control Sulfate (mg/L) |
|---|---|---|---|---|---|
| 0  | 980 | 980 | 980 | 980 | 980 |
| 2  | 346 | 308 | 258 | 303 | 687 |
| 8  | 696 | 671 | 550 | 541 | 913 |
| 14 | —   | —   | 556 | 550 | 963 |
| 21 | 684 | 706 | —   | —   | 895 |
| 25 | —   | —   | 558 | 561 | 947 |
| 37 | 676 | 602 | 538 | 544 | 982 |

— Not measured

Table 17 presents the numeric difference between the pH, alkalinity, and sulfate values from the Active Sodium Lactate microcosms and the Sodium Lactate Kill Control microcosms.

TABLE 17

Difference in Active Sodium Lactate and
Kill Control Sodium Lactate Microcosms

| Day | ΔpH | ΔAlkalinity (mg/L) | ΔSulfate (mg/L) |
|---|---|---|---|
| 0  | 0.00 | 0.00   | 0.00    |
| 2  | 0.01 | 4.50   | 43.34   |
| 9  | 0.19 | 41.00  | 16.22   |
| 15 | 0.00 | −32.50 | 42.34   |
| 25 | 0.11 | −3.00  | 35.90   |
| 29 | 0.11 | −3.00  | 35.90   |
| 35 | 0.34 | 311.40 | −470.15 |

Table 18 presents the numeric difference between the pH, alkalinity, and sulfate values from the Active Mushroom Mulch microcosms and the Mushroom Mulch Kill Control microcosms.

TABLE 18

Difference in Active Mushroom Mulch and
Kill Control Mushroom Mulch Microcosms

| Day | ΔpH | ΔAlkalinity (mg/L) | ΔSulfate (mg/L) |
|---|---|---|---|
| 0  | 0.00 | 0.00  | 0.00     |
| 2  | 0.22 | 0.00  | 41.43    |
| 9  | 0.40 | 4.80  | 8.36     |
| 15 | 0.90 | 8.50  | −32.55   |
| 25 | 0.38 | 9.40  | 21.21    |
| 35 | 2.03 | 43.30 | −210.88  |

Table 19 presents the numeric difference between the pH, alkalinity, and sulfate values from the Active chitin complex microcosms and the chitin complex Kill Control microcosms.

TABLE 19

Difference in Active chitin complex and
Kill Control chitin complex Microcosms

| Day | ΔpH | ΔAlkalinity (mg/L) | ΔSulfate (mg/L) |
|---|---|---|---|
| 0  | 0.00   | 0.00 | 0.00 |
| 2  | 0.84   | −17  | −32  |
| 9  | 0.12   | 129  | 18   |
| 15 | −0.14  | 277  | −299 |
| 25 | −.018  | 360  | −257 |
| 29 | 0.35   | 626  | −432 |
| 35 | −0.23  | 769  | −521 |

The effectiveness of utilizing a substrate that may impact MIW physically, chemically, and biologically can be evaluated through the observation of several chemical and biological parameters including pH, alkalinity, and sulfate concentration. Complex substrates such as chitin complex may impact pH by neutralizing acids through the introduction of a chemical base such as calcium carbonate. Although this process is complex and can include biological and chemical components, this increase in pH will cause a decrease in dissolved metals generally starting with iron and then proceeding to aluminum and then finally to manganese. The introduction of a carbon source may lead to a lowering of the redox potential which may result in a reduction in available electron acceptors including sulfate and an increase in biological activity. The reduction in sulfate may further increase the pH. An increase in biological activity may produce alkalinity (commonly measured as calcium carbonate) that may increase the pH of the MIW. The biological production of alkalinity may be sustained until the organic portion of the substrate is totally mineralized. The process impacting MIW can therefore be evaluated by evaluating changes in pH, alkalinity, and sulfate over time. chitin complex may also contribute to the removal of metals from MIW through sorption. This process is complex and includes various reactions depending upon the individual metal and the redox and pH condition of the MIW. Because of this complexity, evaluation of sorptive capacity of chitin was considered to be part of the chemical process and was not specifically evaluated in this example.

The initial reduction in pH after the establishment of an anaerobic biological system through the addition of a carbon substrate is thought to be primarily due to the metabolism of sulfate within the MIW. Under highly anaerobic (low redox) conditions, sulfate reducing microbes convert sulfate to sulfide thereby increasing the pH by reducing acidity. The addition of a chemical base, such as calcium carbonate from chitin complex, can also chemically neutralize the acidity (and increase pH) of MIW beginning before the establishment of biological sulfate reducing conditions and promote more robust metabolism. This can be observed with the introduction of chitin complex by a rapid change in pH. This rapid change in pH may facilitate precipitation of metals out of solution, and thus significantly decrease the metals concentrations in the MIW within a very short period of time, hours to days compared to weeks to months for other carbon substrates. Preferably, the addition of the carbon substrate causes the pH of the target contaminated source to increase by at least 2 pH units. Sulfate reduction metabolism may also contribute to the removal of metals in MIW through the production of metal sulfides. A second, longer-term impact of establishing an anaerobic biological system through the addition of a slowly degraded carbon substrate may be attributed to sustained anaerobic biological activity which may result in sustained production of calcium carbonate. This can be observed by an increase in alkalinity (as measured as $CaCO_3$) and ammonia and a decrease in metals concentrations.

FIGS. 1-4 graphically depict the changes in pH, dissolved alkalinity, ammonia, and sulfate in the active samples. The microcosms containing chitin complex and chitin complex+Nutrient showed a very rapid increase in pH within 3 days from a pH of 2.95 to over 5.9 and then increasing and remained above 7.0 after 15 days. These microcosms saw an additional increase in pH after 22 days. The Sodium Lactate microcosm showed an initial increase in pH from 2.95 to about 4.89. This is related to sodium lactate's chemical buffering, or abiotic capacity. The increase in pH then leveled off until after day 27 at which time it increased to 6.16 which is interpreted to be from biological activity. The Mushroom Compost microcosms showed slower increases in pH increasing to 4.16 after 3 days. The Mushroom Compost microcosms did not increase pH above 6 until after 27 days. The sediment control showed a minimal increase in pH to about 3.2 even after 37 days.

Both chitin complex microcosms showed significant increases in Alkalinity, as measured by the concentration of $CaCO_3$, from 0.0 mg/L to over 400 mg/L after 12 days followed by a leveling off through day 18 followed by an increase to over 900 mg/L after 37 days. The Sodium Lactate microcosm only increased to about 105 mg/L alkalinity through 27 days and then increased to 389 mg/L alkalinity at 37 days. The majority of this alkalinity increase in the Sodium Lactate microcosm was evident only at the 27 day sampling event. The chitin complex+Nutrient microcosm showed an increased alkalinity of at least 15% over the chitin complex microcosm beginning at day 15 and continuing through day 27 related to increased microbial activity. The Mushroom Compost microcosm and the control microcosm did not increase above 50 mg/L alkalinity through 37 days.

Sulfate concentrations decreased in all four sets of substrate microcosms with chitin complex and chitin complex+Nutrient exhibiting greater than 99% reduction in sulfate after 37 and 27 days respectively. The chitin complex+Nutrient microcosm showed an 18% to 55% greater decrease in Sulfate beginning at day 15 and continuing through day 37. Sulfate only decreased by about 60% in the Sodium Lactate microcosm and only by about 35% in the Mushroom Compost microcosm after 37 days. The chitin complex+Nutrient was the most preferred system.

Ammonia concentrations increased dramatically in the chitin complex and chitin complex+Nutrient microcosms from 0.04 mg/L to about 40 mg/L after 18 days. The Sodium Lactate microcosm showed no increase in Ammonia and the Mushroom Compost microcosm showed a minimal increase from 0.04 mg/L to about 1 mg/L after 18 days.

Figure 5:
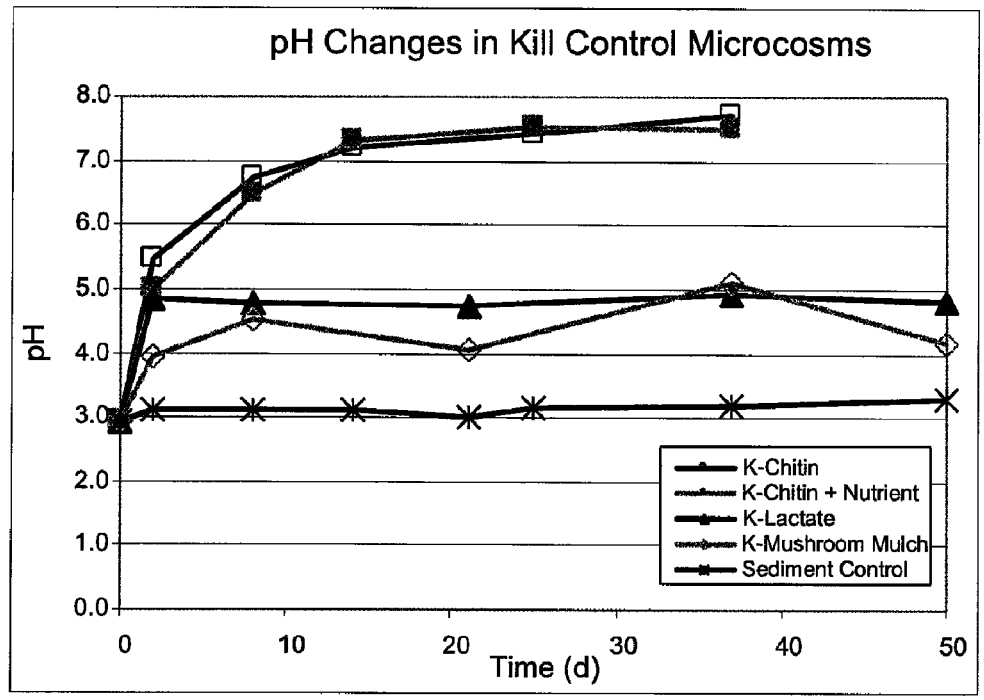
FIG. 5 shows the increase in pH in the Kill Control microcosms containing chitin complex and chitin complex+Nutrients relative to the microcosms containing Mushroom Mulch, Sodium Lactate, and the Sediment Control.
Figure 6:
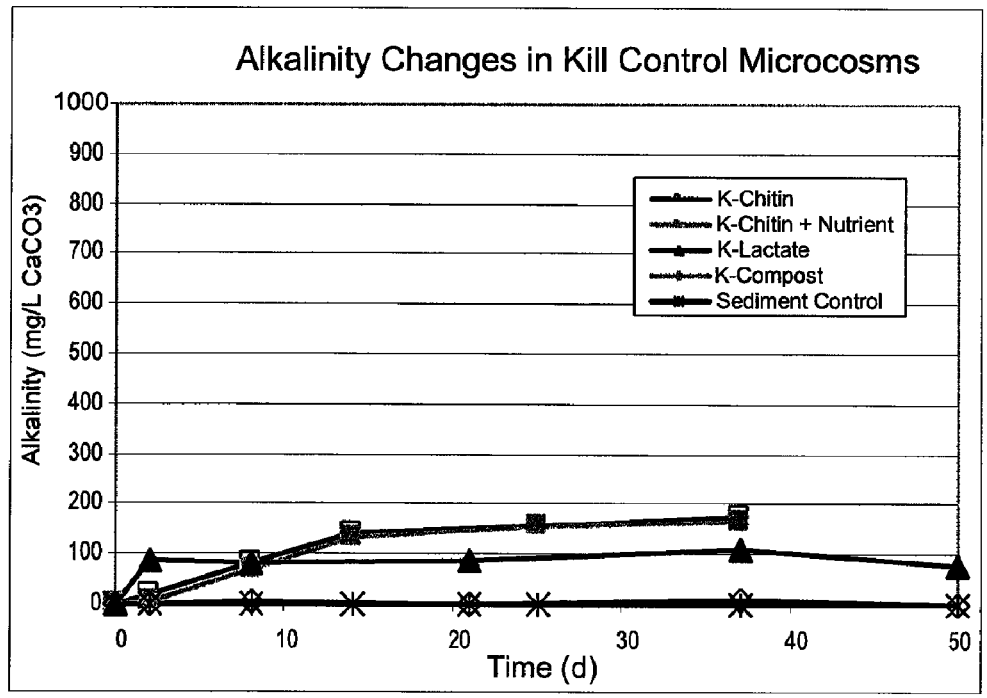
FIG. 6 shows the increase in dissolved alkalinity (as measured as $CaCO_3$) in the Kill Control microcosms containing chitin complex and chitin complex+Nutrients relative to the microcosms containing Mushroom Mulch, Sodium Lactate, and the Sediment Control.
Figure 7:
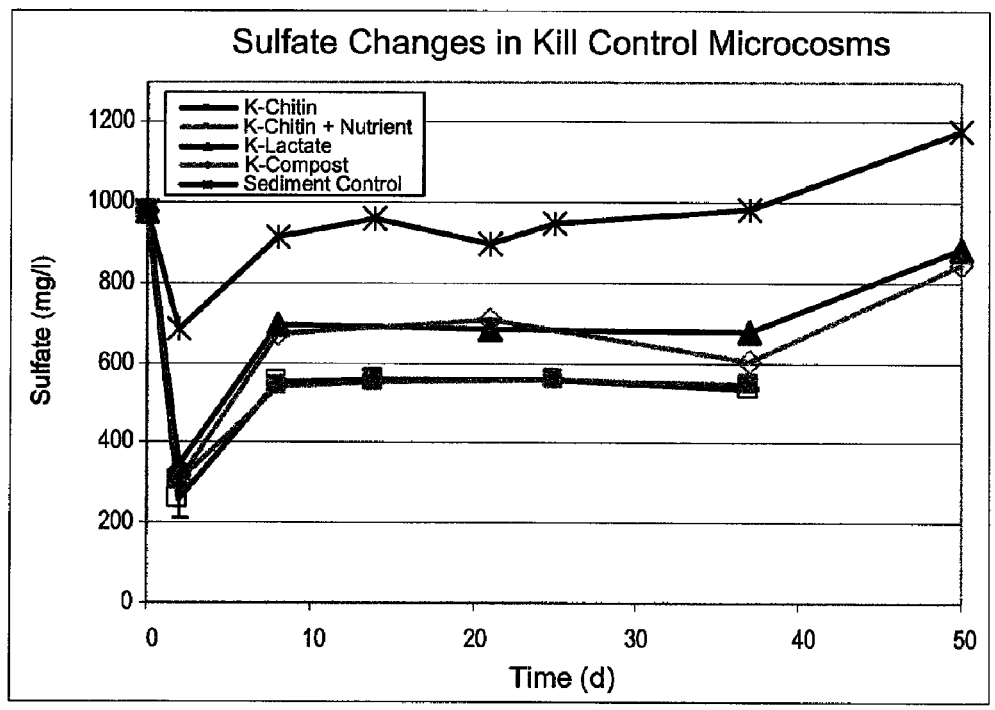
FIG. 7 shows the decrease in sulfate in the Kill Control microcosms containing chitin complex and chitin complex+Nutrients relative to the microcosms containing Mushroom Mulch, Sodium Lactate, and the Sediment Control.

FIGS. 5-7 graphically depict the changes in pH, dissolved alkalinity, and sulfate in the Kill Control samples. Ammonia was not measured in the Kill Control samples. Through the first two days, the Kill Controls showed similar changes in pH when compared with the active microcosms. After 2 days, the chitin complex and the chitin complex+Nutrient kill control microcosms showed similar but less dramatic increases in pH when compared to the active microcosms. The Sodium Lactate and Mushroom Mulch Kill Control kill control microcosms showed minimal increases in pH after 2 days.

The alkalinity in the chitin complex and chitin complex+Nutrient kill control microcosms increased to 80 mg/L after 8 days and then increased to less than 175 mg/L at 14 through 37 days. The alkalinity in the Sodium Lactate kill control microcosms increased to 85 mg/L after 2 days and increased to 108 mg/L between 21 and 37 days. The alkalinity in the Mushroom Compost and the Sediment Control kill control microcosms did not increase above 10 mg/L even at 37 days.

The initial sulfate levels in all of the kill control microcosms through the first 8 days were similar to those of the active samples for each substrate. After 8 days the sulfate levels in the chitin complex Kill Control and chitin complex+Nutrient Kill Control microcosms leveled off at about 550 mg/L. The sulfate levels in the Sodium Lactate Kill Control microcosm leveled off at about 680 mg/L after 8 days. The sulfate levels in the Mushroom Mulch Kill Control microcosms increased to 671 mg/L at 8 days and then decreased from 706 mg/L at 21 days to 602 mg/L at 37 days.

Figure 8:
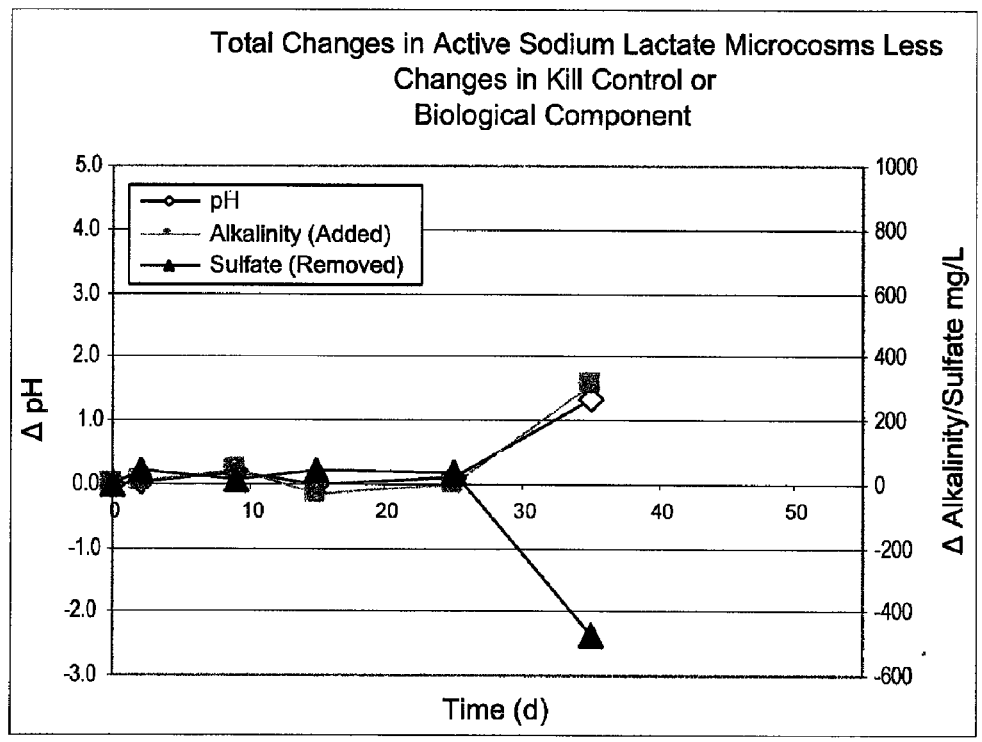
FIG. 8 shows the relative differences in pH, alkalinity, and sulfate concentration between the Active Sodium Lactate microcosms and the Kill Control Sodium Lactate microcosms.
Figure 9:
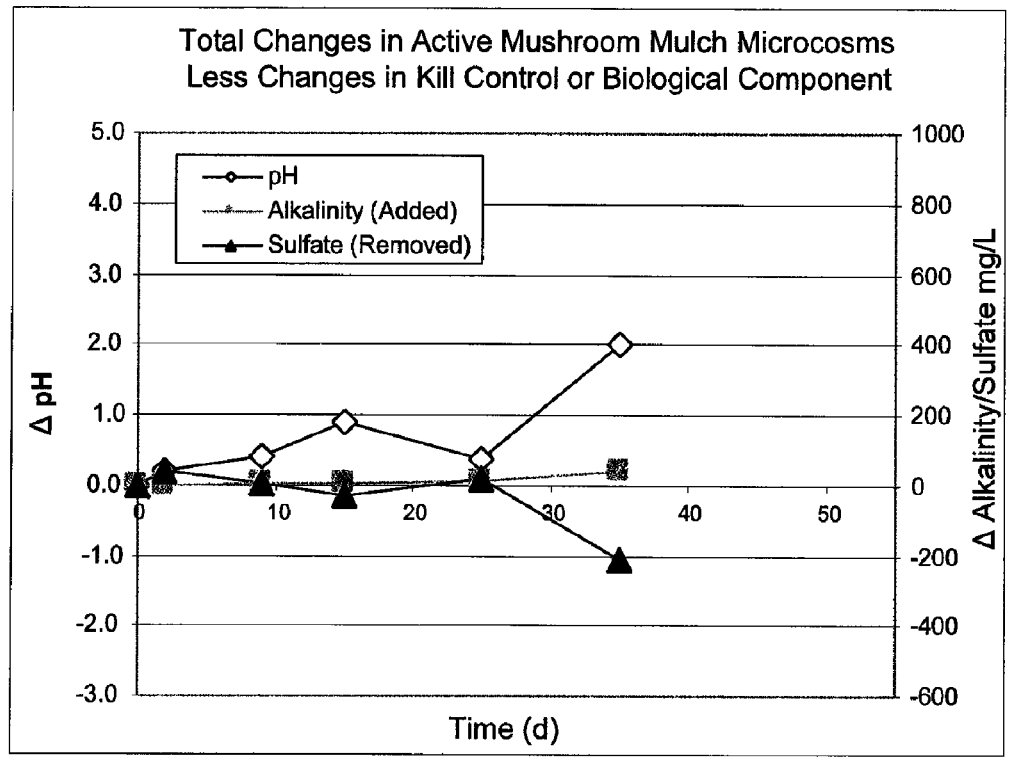
FIG. 9 shows the relative differences in pH, alkalinity, and sulfate concentration between the Active Mushroom Mulch microcosms and the Kill Control Mushroom Mulch microcosms.
Figure 10:
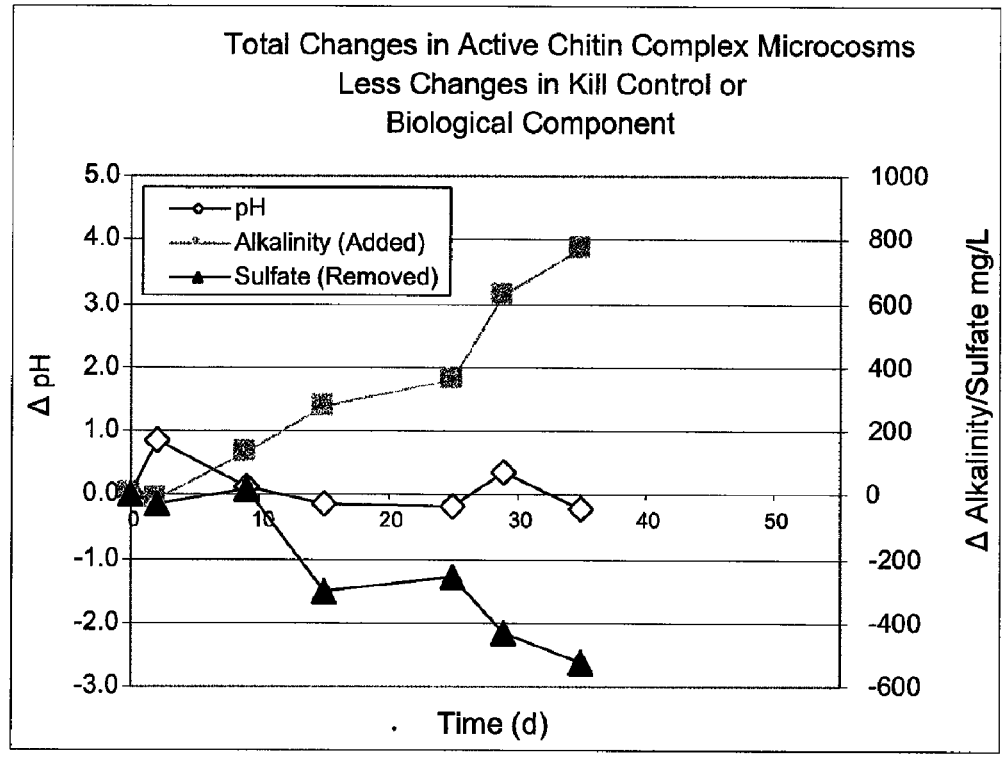
FIG. 10 shows the relative differences in pH, alkalinity, and sulfate concentration between the Active chitin complex microcosms and the Kill Control chitin complex microcosms.
Figure 11:
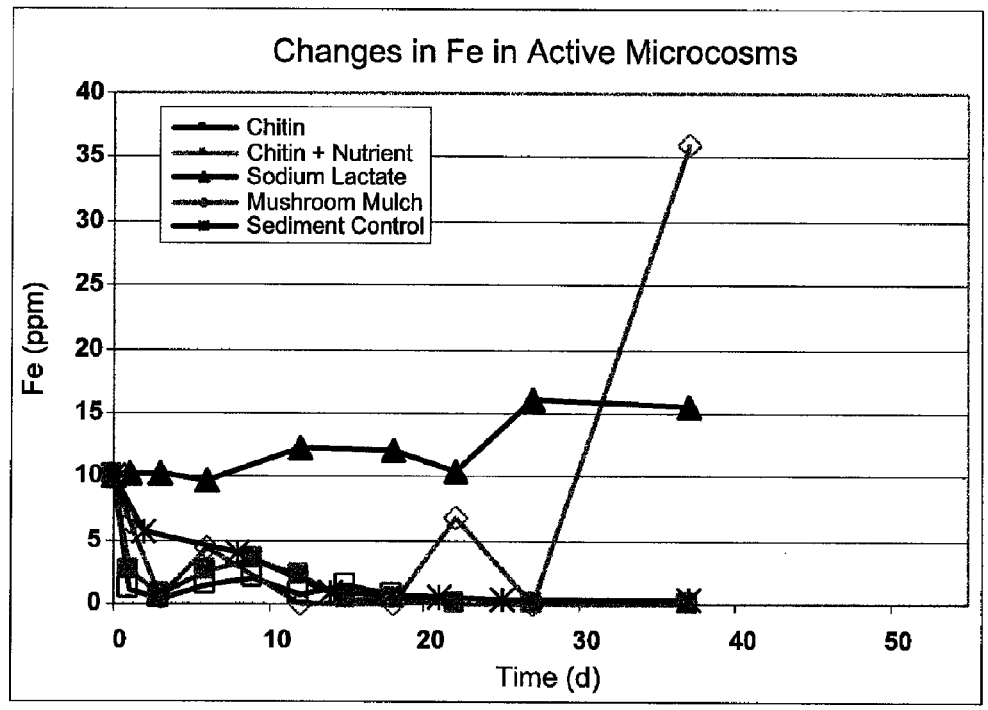
FIG. 11 shows the rapid decrease and partial rebound in dissolved iron in the Active microcosms containing chitin complex, chitin complex+Nutrients, Mushroom Mulch, and Sediment Control relative to Sodium Lactate microcosm.
Figure 12:
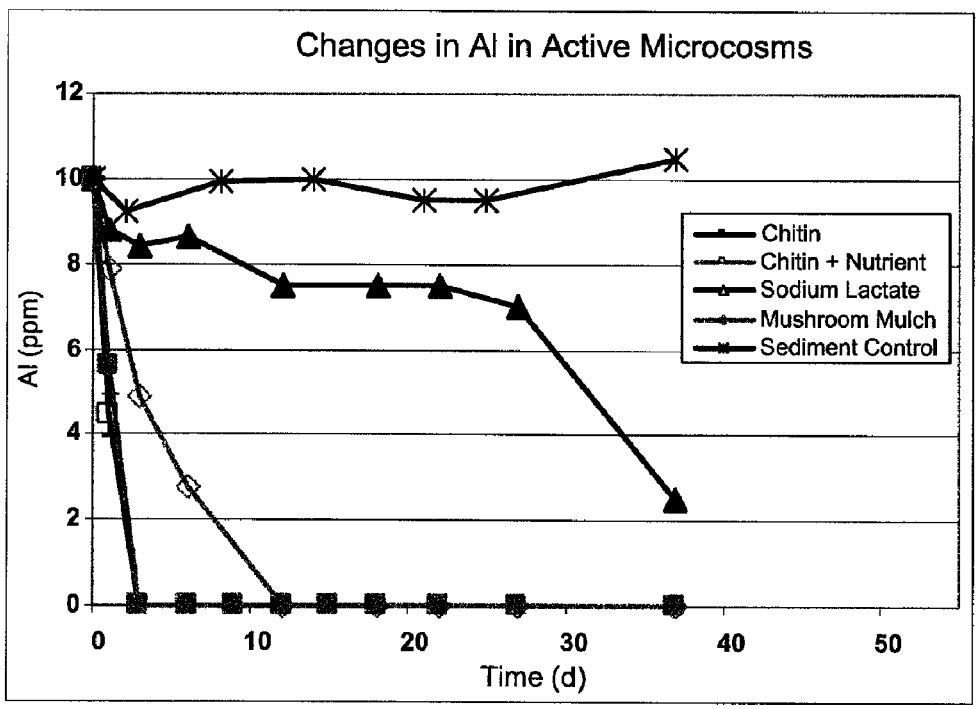
FIG. 12 shows the rapid decrease in dissolved aluminum in the Active microcosms containing chitin complex and chitin complex+Nutrients relative to the microcosms containing Mushroom Mulch, Sodium Lactate, and the Sediment Control.
Figure 13:
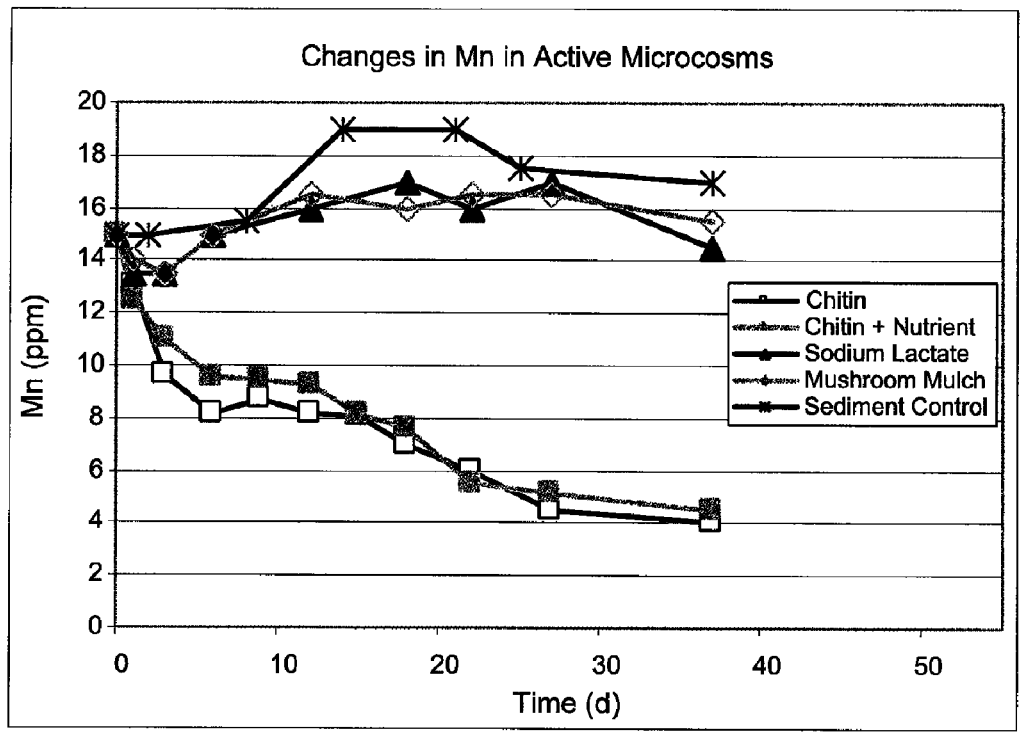
FIG. 13 shows the rapid decrease in manganese in the Active microcosms containing chitin complex and chitin complex+Nutrients relative to the microcosms containing Sodium Lactate, Mushroom Mulch, and the Sediment Control.
Figure 14:
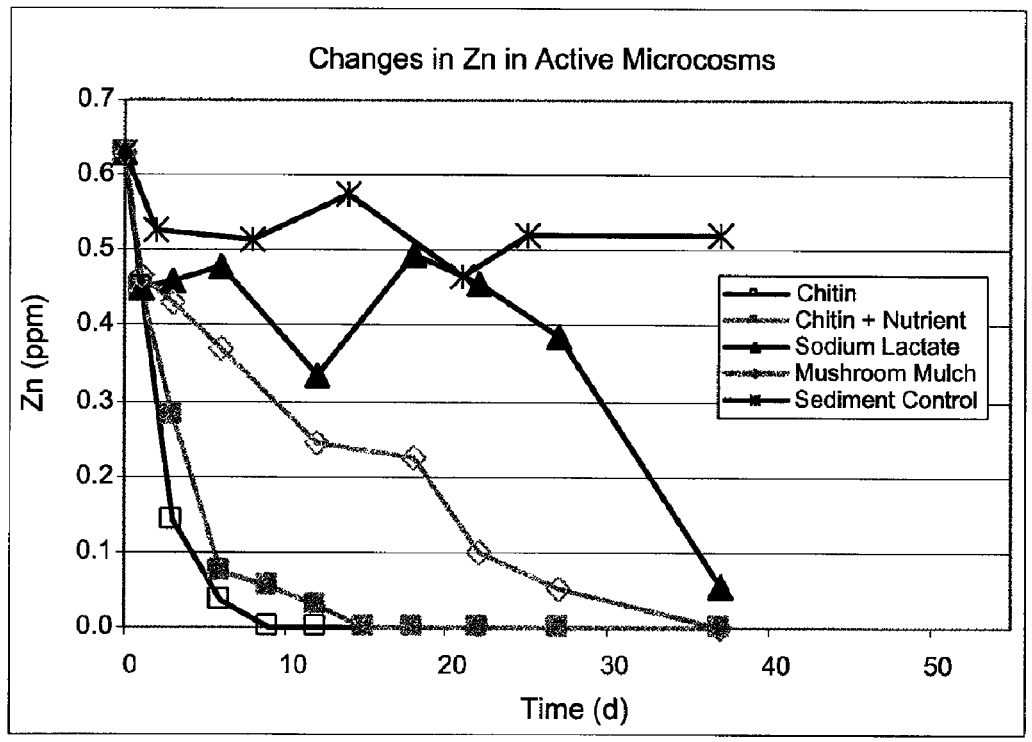
FIG. 14 shows the rapid decrease in zinc in the Active microcosms containing chitin complex and chitin complex+Nutrients relative to the microcosms containing Mushroom Mulch, Sodium Lactate, and the Sediment Control.

FIGS. 8-10 graphically depict the differences in pH, alkalinity, and sulfate between the Active microcosms and the Kill Control microcosms for each substrate. The Kill Controls were considered to be an indicator of abiotic activity while the Active microcosms were considered an indicator of both biotic and abiotic impact on pH, alkalinity, and sulfate. The difference between the Active and Kill control microcosms may be considered an indicator of the contribution of biological activity on pH, alkalinity, and sulfate. A comparison of the Active and Kill Controls for the Sodium Lactate microcosms indicates that biological activity does not significantly contribute to changes in pH, alkalinity, or sulfate until after day 25 at which time all three parameters change by 2 orders of magnitude with pH increasing over 1.3 standard unit, alkalinity increased by over 310 mg/L, and sulfate being reduced by 470 mg/L.

A comparison of the Active and Kill Controls for the Mushroom Mulch microcosms indicates that there is some biological activity within the first week that increases after 37 days. Although this activity increases, it is not considered indicative of robust metabolism as only the pH and the sulfate concentrations have changed while the alkalinity increased less than 15% that of the Sodium Lactate microcosm. Unless chemically introduced, alkalinity can only increase through significant biological activity. At 37 days, pH increased by 2 standard units, alkalinity increased by 43 mg/L, and sulfate was reduced by 210 mg/L.

A comparison of the Active and Kill Controls for the chitin complex microcosms indicates that biological activity begins within 2 days of the establishment of the microcosms when the biological contribution of pH increases 1 standard unit. At 9 days the alkalinity increases by over 120 mg/L and sulfate was reduced by 299 mg/L. Significant (greater than an increase in 1 standard unit) changes in pH did not occur in this microcosm. This was most likely due to a dramatic chemical increase in pH from 2.95 to over 6 within the first 36 hours. Since pH is measured logarithmically, an increase from a pH of 6 to a pH of 7 represents a greater change than an increase from a pH of 2.95 to a ph of 3.95. Additionally, an optimal pH range for biological activity is generally between a pH of 6.5 and a pH of 7.5. This general pH range was established and maintained in the chitin complex microcosm beginning at about day 3 and continuing through day 37 so a change in pH in this microcosm was not necessarily expected.

FIG. 11-14 graphically depict the reduction in dissolved iron, aluminum, manganese, and zinc concentrations, respectively. Dissolved Iron decreased by over 97% in the chitin complex microcosm after 3 days. In this same period, dissolved Iron decreased by over 95% in the Mushroom Compost microcosm and 93% in the chitin complex+Nutrient microcosm. All three of these microcosms showed a rebound in dissolved Iron after 3 days with the Mushroom Mulch increasing to over 4.4 mg/L for only a 55% overall decrease in dissolved iron and the chitin complex microcosm to about 2 mg/L or about an 80% decrease in dissolved Iron. The Sodium Lactate microcosm showed a decrease in dissolved Iron of less than 5% after 6 days.

Dissolved Aluminum decreased from 10 mg/L to non-detectable levels both in the chitin complex and the chitin complex+Nutrient microcosms after 3 days. After 6 days, the dissolved Aluminum concentration decreased by about 78% in the Mushroom Mulch microcosm and by about 13% in the Sodium Lactate microcosm.

After 9 days, dissolved Manganese decreased by about 52% and 47% in the chitin complex and chitin complex+Nutrient microcosms, respectively. The dissolved Aluminum concentration in the Mushroom Mulch microcosm and the Sodium Lactate microcosm decreased by about 10% and then rebounded back to 15 mg/L after 9 days.

Dissolved Zinc decreased from 0.63 mg/L to non-detectable levels in the chitin complex microcosm and over 90% in the chitin complex+Nutrient microcosms after 9 days. The dissolved Zinc concentration decreased by over 41% in the Mushroom Compost microcosm and by about 24% in the Sodium Lactate microcosm after 6 days.

The accelerated rates of increase in pH, dissolved alkalinity, and ammonia in the chitin complex and chitin complex+Nutrient microcosms indicate that these substrates can establish biological and chemical conditions conducive to the removal of metals from MIW at a faster rate than either Sodium Lactate or Mushroom Mulch. The rate of decrease in sulfate in the chitin complex and chitin complex+Nutrient microcosms also supports a more favorable impact than with Sodium Lactate or Mushroom Mulch. The rates of decrease in dissolved iron are similar for all four substrates except for Sodium Lactate which showed a slower decrease. The rebound in dissolved Iron in the other three microcosms is believed to be due to iron temporarily sorbing onto the chitin complex and Mushroom Mulch matrices. The rate of decrease in dissolved aluminum, manganese, and zinc was shown to be significantly greater in the chitin complex and chitin complex+Nutrient microcosms as compared to those without chitin complex. The chitin complex and chitin complex+Nutrient microcosms show a minimum of over 70% greater reduction in manganese when compared to the other substrates.

The accelerated decrease in Sulfate and increase in Alkalinity in the chitin complex+Nutrient compared specifically to the chitin complex microcosm indicates increased biological activity most likely due to the addition of the Nutrient. The accelerated decrease in Sulfate indicates an increase in the activity of sulfate reducing bacteria. The accelerated increase in Alkalinity indicates an increase in biomass most likely associated with the increase in metabolism of sulfate reducing and facultative bacteria.

We claim:

1. A method for remediation of a contaminated medium containing at least one contaminant, said method comprising addition of an effective amount of a chitin complex-containing material to the contaminated medium, said effective amount being an amount of the chitin complex-containing material that is sufficient to cause separation of substantial amount of said at least one contaminant from the contaminated medium, said contaminant being at least one member selected from the group consisting of a metal, an acid-forming mineral and combinations thereof, wherein the chitin complex-containing material is added to the contaminated medium in situ.

2. The method of claim 1, wherein said effective amount is an amount of the chitin complex-containing material that when added to the contaminated medium increases the pH of the contaminated medium by at least one standard pH unit within 48 hours after the addition.

3. The method of claim 1 wherein said effective amount is an amount of the chitin complex-containing material that when added to the contaminated medium increases the alkalinity of the contaminated medium.

4. The method of claim 1 wherein said contaminated medium contains at least one microorganism selected from the group consisting of a mineral reducing microbe, a metal metabolizing microbe, a sulfate reducing microbe, a nitrate-metabolizing microbe, and combinations thereof.

5. The method of claim 2, wherein the pH of the contaminated medium is lower than 3.5 before the addition of said chitin complex-containing material in said effective amount.

6. The method of claim 1 wherein the effective amount is an amount of the chitin complex-containing material that when added to said contaminated medium decreases the reductive-oxidation potential of the medium.

7. The method of claim 6 wherein said effective amount is an amount of the chitin complex-containing material that when added to the contaminated medium decreases the reductive-oxidation potential of the contaminated medium by at least 50 millivolts.

8. The method of claim 4, further comprising a step of adding a nutrient comprising at least one yeast metabolite to said contaminated medium for increasing the metabolic kinetics of said at least one microorganism.

9. The method of claim 1 wherein said contaminated medium comprises at least one metal.

10. The method of claim 9 wherein the effective amount is an amount of the chitin complex-containing material that inhibits the resolubilization of said at least one metal in said contaminated medium.

11. The method of claim 4 wherein the microorganism is *Thiobacillus ferroxidans*.

12. The method of claim 1 wherein the chitin complex-containing material is added to the surface of said contaminated medium or injected into the subsurface of said contaminated medium.

13. The method of claim 1 wherein the chitin complex-containing material is added into a space below ground surface through a conduit selected from the group consisting of a boring, a hole, a trench, an excavation and combinations thereof, said contaminated medium being held in said space.

14. A method for remediation of a contaminated medium containing at least one contaminant, said method comprising addition of an effective amount of a chitin complex-containing material to the contaminated medium, wherein the chitin complex-containing material is added ex situ by placing the chitin complex-containing material into an engineered system selected from the group consisting of an engineered anaerobic wetland, an engineered aerobic wetland, a subsurface bioreactor, a water treatment system, and combinations thereof, wherein said contaminated medium contains at least one microorganism selected from the group consisting of a mineral reducing microbe, a metal metabolizing microbe, a sulfate reducing microbe, a nitrate-metabolizing microbe, and combinations thereof, said at least one microorganism being indigenous to said contaminated medium.

15. A method for remediation of a contaminated medium containing at least one contaminant, said method comprising addition of an effective amount of a chitin complex-containing material to the contaminated medium, said effective amount being an amount of the chitin complex-containing material that is sufficient to cause separation of substantial amount of said at least one contaminant from the contaminated medium, said contaminated medium containing at least one microorganism selected from the group consisting of a mineral reducing microbe, a metal metabolizing microbe, a sulfate reducing microbe, a nitrate-metabolizing microbe, and combinations thereof, wherein said at least one microorganism is indigenous or non-indigenous to said contaminated medium.

16. The method of claim 15, wherein said at least one microorganism is selected from the group consisting of a metal metabolizing microbe, a nitrate-metabolizing microbe, and combinations thereof.

17. The method of claim 15 wherein the microorganism is *Thiobacillus ferroxidans*.

18. The method of claim 15, wherein said contaminated medium is an aqueous liquid medium, said at least one microorganism being indigenous to said contaminated medium, wherein no other microorganism is added to the contaminated medium.

19. The method of claim 15 further comprising a step of adding a nutrient comprising at least one yeast metabolite to said contaminated medium for increasing the metabolic kinetics of said at least one microorganism.

20. The method of claim 1, wherein the chitin complex-containing material comprises at least one member selected from the group consisting of crustacean shell, arthropods, fungi, yeast cells, fungal or yeast fermentation broth, and combination thereof.

21. The method of claim 3 wherein said effective amount is an amount of the chitin complex-containing material that when added to the contaminated medium increases the alkalinity of the contaminated medium by at least 10 milligrams per liter.

22. The method of claim 1 wherein the remediation is an abiotic remediation, and the effective amount is an amount of the chitin complex-containing material that when added to the contaminated medium increases the pH of the contaminated medium by at least one standard pH unit.

23. The method of claim 1 wherein the remediation is an abiotic remediation, and the effective amount is an amount of the chitin complex-containing material that when added to the contaminated medium increases the alkalinity of the contaminated medium by at least 10 milligrams per liter.

24. The method of claim 1 wherein the remediation is an abiotic remediation, and the effective amount is an amount of the chitin complex-containing material that when added to the contaminated medium promotes sorption of the contaminant from the contaminated medium.

25. The method of claim 1, wherein the contaminated medium is an aqueous medium other than ground water and contains at least one contaminant, said method comprising the addition of an effective amount of a chitin complex-containing material to the contaminated medium, said effective amount being an amount of the chitin complex-containing material that is sufficient to cause separation of substantial amount of said at least one contaminant from the contaminated medium, said contaminant being at least one metal.

26. The method of claim 25, wherein the contaminated medium has a pH equal or greater than 7.0 before addition of the chitin complex-containing material.

27. The method of claim 14, wherein said at least one microorganism is selected from the group consisting of a metal metabolizing microbe, a nitrate-metabolizing microbe, and combinations thereof.

28. The method of claim 14, wherein the microorganism is *Thiobacillus ferroxidans*.

29. The method of claim 15, wherein said effective amount is an amount of the chitin complex-containing material that when added to the contaminated medium increases the pH of the contaminated medium by at least one standard pH unit within 48 hours after the addition.

30. The method of claim 29, wherein the pH of the contaminated medium is lower than 3.5 before the addition of said chitin complex-containing material in said effective amount.

31. The method of claim 15 wherein said effective amount is an amount of the chitin complex-containing material that when added to said contaminated medium decreases the reductive-oxidation potential of the medium.

32. The method of claim 15 wherein said contaminated medium comprises at least one metal.

33. The method of claim 32 wherein the effective amount is an amount of the chitin complex-containing material that inhibits the resolubilization of said at least one metal in said contaminated medium.

34. The method of claim 15 wherein the chitin complex-containing material is added to the surface of said contaminated medium or injected into the subsurface of said contaminated medium.

35. The method of claim 15 wherein the chitin complex-containing material is added into a space below ground surface through a conduit selected from the group consisting of a boring, a hole, a trench, an excavation and combinations thereof, said contaminated medium being held in said space.

36. The method of claim 15, wherein the chitin complex-containing material comprises at least one member selected from the group consisting of crustacean shell, arthropods, fungi, yeast cells, fungal or yeast fermentation broth, and combination thereof.

37. The method of claim 15 wherein said effective amount is an amount of the chitin complex-containing material that when added to the contaminated medium increases the alkalinity of the contaminated medium by at least 10 milligrams per liter.

38. The method of claim 15 wherein the contaminated medium has a pH equal or greater than 7.0 before addition of the chitin complex-containing material.

39. The method of claim 15 wherein the effective amount is an amount of the chitin complex-containing material that when added to the contaminated medium promotes sorption of the contaminant from the contaminated medium.

* * * * *